(12) United States Patent
Robuck et al.

(10) Patent No.: US 11,939,984 B2
(45) Date of Patent: Mar. 26, 2024

(54) COMPRESSORS HAVING MULTI-SPEED GEARBOXES

(71) Applicant: The Boeing Company, Chicago, IL (US)

(72) Inventors: Mark J. Robuck, Chadds Ford, PA (US); Scott H. Bouwer, Wilmington, DE (US); John C. Walters, Glen Mills, PA (US); Steve G. Mackin, Bellevue, WA (US)

(*) Notice: Subject to any disclaimer, the term of this patent is extended or adjusted under 35 U.S.C. 154(b) by 0 days.

(21) Appl. No.: 17/667,534

(22) Filed: Feb. 8, 2022

(65) Prior Publication Data
US 2022/0349410 A1 Nov. 3, 2022

Related U.S. Application Data

(60) Provisional application No. 63/181,728, filed on Apr. 29, 2021.

(51) Int. Cl.
*F04D 25/02* (2006.01)
*F04D 27/00* (2006.01)
*F04D 29/063* (2006.01)
*B64D 13/06* (2006.01)

(52) U.S. Cl.
CPC ......... *F04D 25/028* (2013.01); *F04D 27/004* (2013.01); *F04D 27/007* (2013.01); *F04D 29/063* (2013.01); *B64D 13/06* (2013.01)

(58) Field of Classification Search
CPC .......... F04D 25/028; F01D 25/18; F02C 7/32; F16H 57/02; B64D 13/0603
See application file for complete search history.

(56) References Cited

U.S. PATENT DOCUMENTS

| | | | |
|---|---|---|---|
| 8,747,272 B2* | 6/2014 | Imai | B64C 25/405 |
| | | | 475/159 |
| 8,905,885 B2 | 12/2014 | Yamamoto et al. | |
| 9,810,158 B2* | 11/2017 | Foutch | F02C 7/18 |
| 10,100,744 B2* | 10/2018 | Mackin | F02C 6/08 |
| 10,738,710 B2* | 8/2020 | Sidelkovskiy | F02C 7/36 |
| 10,808,625 B2 | 10/2020 | Yoshitomi et al. | |
| 11,454,175 B2* | 9/2022 | Amari | F02C 9/18 |

(Continued)

FOREIGN PATENT DOCUMENTS

DE 102006044725 A1 * 8/2007 ............... F01P 5/04

OTHER PUBLICATIONS

United States Patent and Trademark Office, "Non-Final Office Action," issued in connection with U.S. Appl. No. 17/444,346, dated Oct. 4, 2022, 5 pages.

(Continued)

*Primary Examiner* — Igor Kershteyn
*Assistant Examiner* — Jackson N Gillenwaters
(74) *Attorney, Agent, or Firm* — HANLEY, FLIGHT & ZIMMERMAN, LLC

(57) ABSTRACT

Compressors having multi-speed gearboxes are disclosed. The apparatus comprises: a fluid channel to convey a fluid, a compressor fluidly coupled to the fluid channel, a gearbox operatively coupled to the compressor, the gearbox to control the compressor using a first gear ratio and a second gear ratio different from the first gear ratio to vary a flow rate of fluid in the fluid channel, and clutches to vary the gearbox between the first gear ratio and the second gear ratio.

26 Claims, 18 Drawing Sheets

(56) References Cited

U.S. PATENT DOCUMENTS

| | | | |
|---|---|---|---|
| 2019/0193524 A1* | 6/2019 | Stoltz | B60H 1/3208 |
| 2019/0383220 A1* | 12/2019 | Mackin | B64D 15/02 |
| 2021/0189970 A1 | 6/2021 | Morreale et al. | |
| 2022/0268198 A1* | 8/2022 | Hennessy | F04D 25/02 |
| 2022/0349410 A1 | 11/2022 | Robuck et al. | |
| 2023/0038989 A1 | 2/2023 | Walters et al. | |

OTHER PUBLICATIONS

United States Patent and Trademark Office, "Notice of Allowance and Fee(s) Due," issued in connection with U.S. Appl. No. 17/444,346, dated Apr. 5, 2023, 7 pages.

United States Patent and Trademark Office, "Non-Final Office Action," issued in connection with U.S. Appl. No. 17/444,346, dated Nov. 22, 2023, 9 pages.

* cited by examiner

COMPRESSORS HAVING MULTI-SPEED GEARBOXES

RELATED APPLICATION

This patent claims the benefit of U.S. Provisional Patent Application No. 63/181,728, which was filed on Apr. 29, 2021. U.S. Provisional Patent Application No. 63/181,728 is hereby incorporated herein by reference in its entirety. Priority to U.S. Provisional Patent Application No. 63/181,728 is hereby claimed.

FIELD OF THE DISCLOSURE

This disclosure relates generally to compressors and, more particularly, to compressors having multi-speed gearboxes.

BACKGROUND

Commercial aircraft typically include one or more systems to provide pressurized air to a cabin thereof. In particular, commercial aircraft often employ an environmental control system (ECS) to pressurize the cabin with air. In some known implementations, the ECS is also used for thermal anti-icing systems to provide heated air to at least a portion of an aircraft engine.

SUMMARY

An example apparatus includes a fluid channel to convey a fluid, a compressor fluidly coupled to the fluid channel, a gearbox operatively coupled to the compressor, the gearbox to control the compressor using a first gear ratio and a second gear ratio different from the first gear ratio to vary a flow rate of fluid in the fluid channel, and clutches to vary the gearbox between the first gear ratio and the second gear ratio.

An example aircraft engine includes a fluid channel having an inlet and outlet, and a compressor. The compressor includes a gearbox having a first gear ratio and a second gear ratio different from the first gear ratio, and clutches to control the gearbox between the first gear ratio and the second gear ratio to vary a flow rate of fluid in the fluid channel.

An example method of controlling a compressor of an aircraft includes determining an operating condition of the aircraft and controlling, based on the operating condition, clutches to vary a gearbox between a first gear ratio and a second gear ratio different from the first gear ratio. The gearbox is to control a flow rate of fluid moving from the compressor to a fuselage of the aircraft.

Figure 1:
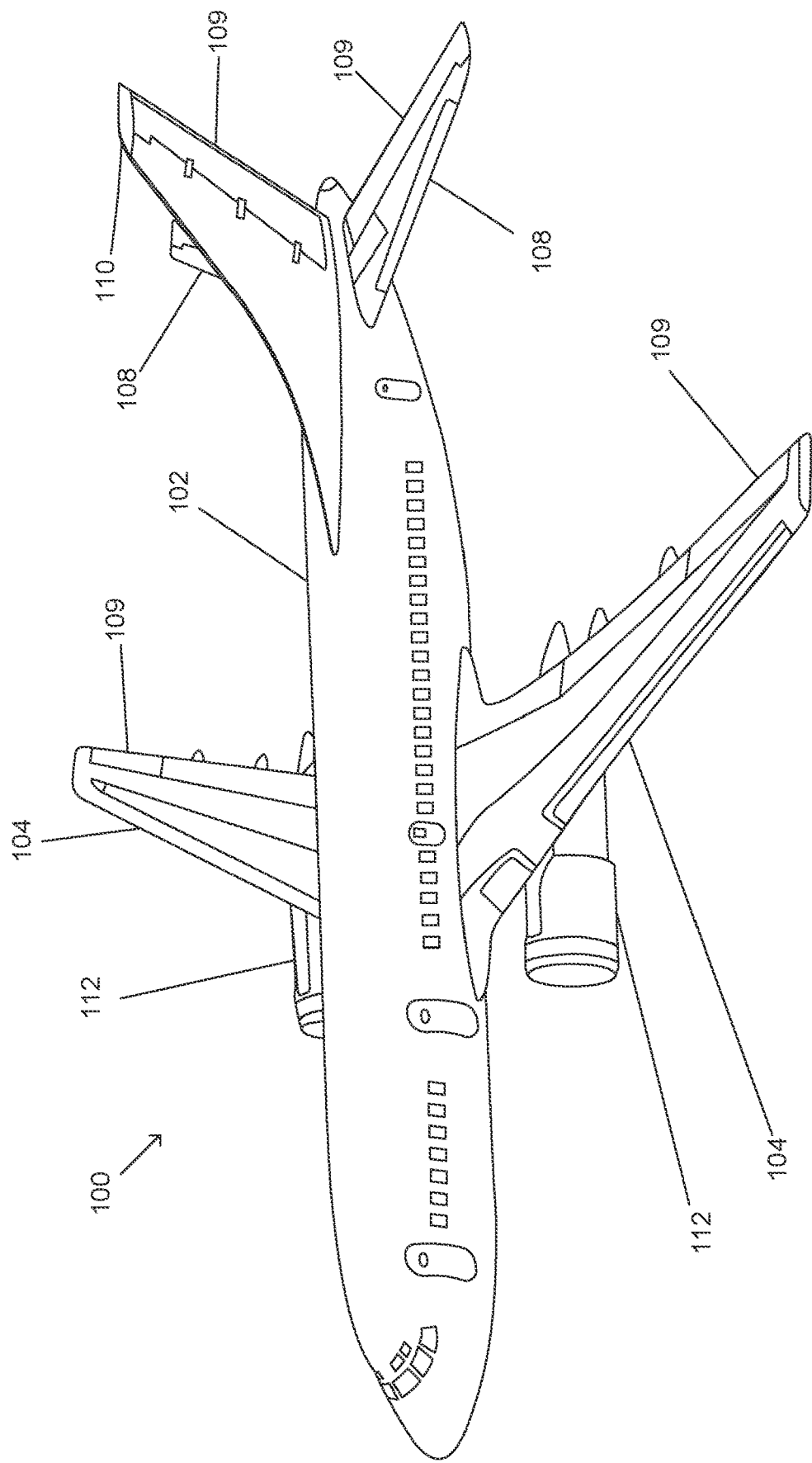
FIG. 1 is an example aircraft in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Compressors having multi-speed gearboxes are disclosed. In known implementations, cabins of aircraft are provided with pressurized air to maintain a habitable environment for passengers. To control pressure and temperature of the air, some known systems utilize bleed air provided from engine compressors that utilize auxiliary power units (APUs). While these known implementations can generate suitable air characteristics for a cabin, they can have significant drawbacks. For example, utilizing bleed air can sometimes have a detrimental effect on engine performance and efficiency, thereby resulting in increased fuel consumption, slower cruising speeds, and reduced range. Moreover, the aforementioned APUs are designed for intermittent use and, thus, continuous duty can result in premature wear or reduced life thereof.

Examples disclosed herein enable accurate and consistent control of air provided to a cabin via a compressor with an associated gearbox (e.g., a transmission). In other words, examples disclosed herein utilize a gearbox that can effectively enable a compressor to adapt to different aircraft conditions, thereby maintaining a relatively constant and consistent supply of air to the cabin. As a result, equipment typically utilized to ensure that the air is delivered to the cabin is adequately controlled may be eliminated, thereby saving cost and weight of the aircraft.

As mentioned above, examples disclosed herein implement a compressor (e.g., a shaft-driven compressor) that is operatively coupled to a gearbox. In turn, the gearbox controls power delivery to the compressor to accommodate different flight phases of an aircraft. In particular, the gearbox operates at multiple gear ratios to control operation of the compressor. A gear ratio of the gearbox can be selected based on a current phase of flight (e.g., takeoff, landing, cruise, etc.). According to examples disclosed herein, the gear ratios can be adjusted via a system of clutches (e.g., a plurality of clutches, etc.) operatively coupled to the compressor. Thus, the gearbox can control the aforementioned compressor in a manner similar to that of a speed-variable transmission, for example. In some examples, a first gear ratio corresponds to takeoff of the aircraft, a second gear ratio corresponds to cruise of the aircraft, and a third gear ratio corresponds to descent/landing of the aircraft.

In some examples, the gearbox can switch between the different gear ratios by utilizing a lubrication system. In some such examples, the lubrication system is controlled by at least one solenoid (e.g., a system of solenoids controls a distribution of lubrication to change operating states of at least one clutch of the gearbox). In some examples, a controller controls the gearbox, the lubrication system and/ or the clutches. In some examples, the gearbox includes a disconnect to decouple the gearbox from an engine. In some examples, the system of clutches can include at least one of a sprag clutch, a carrier clutch, or a ring gear clutch. In some examples, components of the system of clutches (e.g., pistons and stators), the lubrication system, the solenoids, and/or other components of the gearbox are non-rotatable (e.g., static). In some examples, the system of clutches can be controlled by an operator (e.g., a pilot) of the aircraft. Additionally or alternatively, the system of clutches is controlled based on sensor data and/or an operating mode of the aircraft.

FIG. 1 illustrates an example aircraft 100 in which examples disclosed herein can be implemented. As can be seen in the illustrated example of FIG. 1, the aircraft 100 is a passenger aircraft and includes a fuselage 102, wings 104, horizontal stabilizers 108, control surfaces 109 and vertical stabilizers 110. Further, the example wings 104 support engines 112. While the aircraft 100 shown in the example of FIG. 1 is implemented as a passenger aircraft, examples disclosed herein can be applied to any appropriate aircraft (e.g., unmanned aircraft) and/or vehicle (e.g., a watercraft, a ground-based vehicle, a submersible, etc.).

In operation, the aircraft 100 is propelled forward by the engines 112 while the wings 104 generate lift. As the aircraft 100 is propelled forward, the control surfaces 109 are moved and/or deflected to direct movement of and/or maneuver the aircraft 100. In other words, the engines 112 of the illustrated example provide thrust to the aircraft 100 while movement and/or deflection of the control surfaces 109 affects a heading of the aircraft 100. Further, in this example, the engines 112 provide pressurized fluid and/or air to the fuselage 102 to pressurize a cabin thereof and, thus, provide a habitable environment for passengers. Examples disclosed herein enable a controlled transfer of the pressurized fluid and/or air into the fuselage 102 by controlling an example compressor 202 (FIG. 2) that is associated with the respective engine 112. The operation of the example compressor 202 is shown and described in greater detail below in connection with FIGS. 2-15. According to examples disclosed herein, different gear ratios of the compressor 202 are selected and/or operated via a plurality of clutches to control parameters of the pressurized fluid and/or air provided from the compressor 202. Ones of the gear ratios can be selected based on a flight condition and/or flight mode of the aircraft 100.

Figure 2:
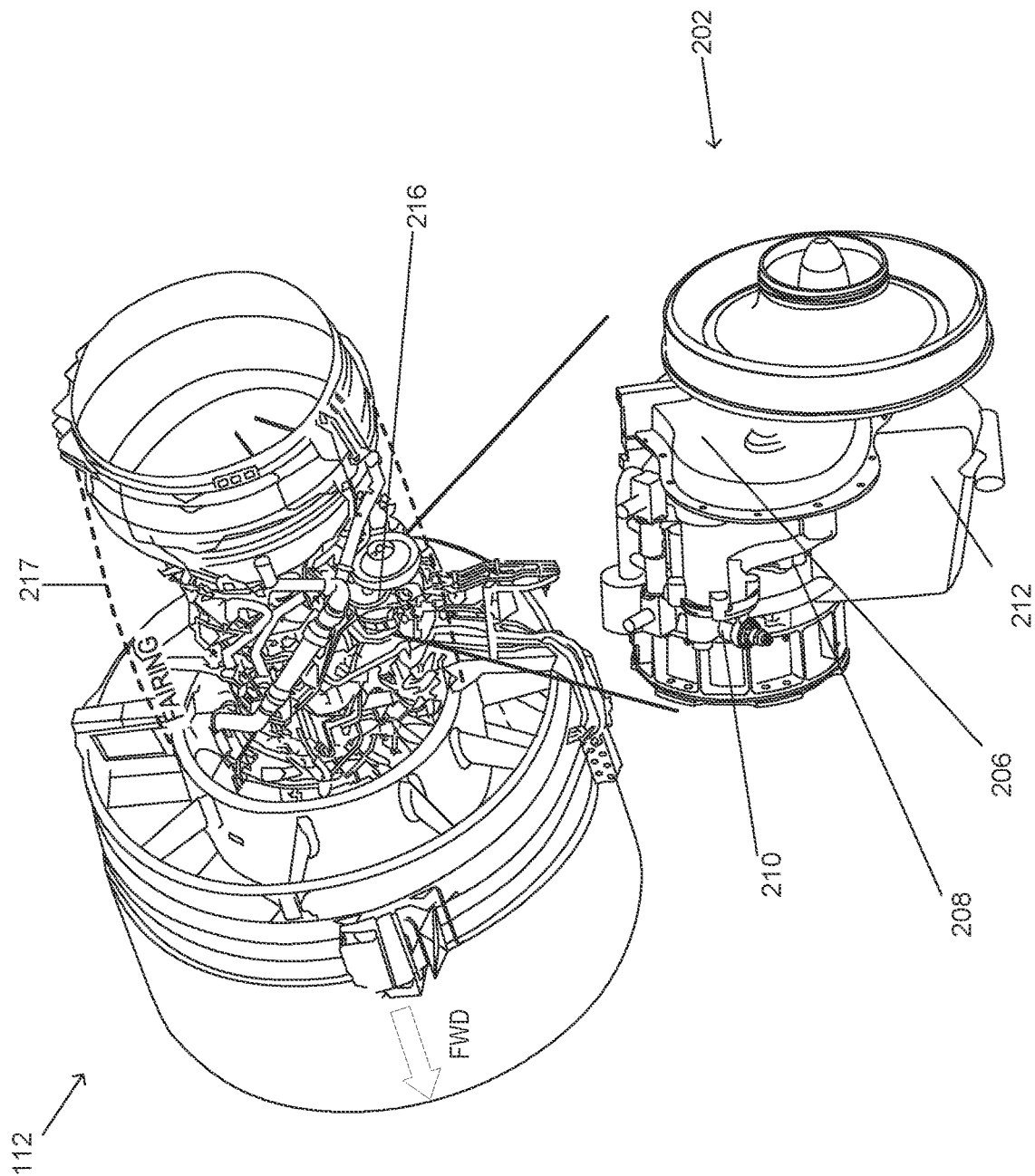
FIG. 2 illustrates an example aircraft engine having an example compressor in accordance with teachings of this disclosure.

FIG. 2 illustrates the example aircraft engine 112 having the aforementioned example compressor 202 in accordance with teachings of this disclosure. The example compressor 202 includes a gearbox 206, a lubricant pump 208, a filter 210, and a lubricant reservoir 212. In some examples, the compressor 202 and/or the gearbox 206 are part of a gearbox assembly 216 disposed within a fairing 217. Further, the example gearbox 206 includes a system of gears, which is shown and described in greater detail below in connection below with FIGS. 3-15.

In operation, the compressor 202 is implemented to provide pressurized fluid, which is air in this example, from the engine 112 to the fuselage 102 shown in FIG. 1. In this particular example, the compressor 202 is implemented as a shaft-driven compressor having a portion thereof that is rotated to provide the air to the fuselage 102. As will be discussed in greater detail below in connection with FIGS. 3-15, the gearbox 206 is operatively coupled to the compressor 202 and a gear ratio of the gearbox 206 is selected to affect properties (e.g., pressure, flow rate, etc.) of the air entering the fuselage 102. As a result, the properties of the air entering the fuselage 102 can be held relatively constant and/or consistent even if operating conditions (e.g., a current operating mode, external conditions, etc.) are varying. While the compressor 202 is shaft-driven in this example, any appropriate compressor type can be implemented instead.

In some examples, the gearbox 206 is fluidly coupled to the example lubricant reservoir 212. In particular, the example lubricant reservoir 212 stores and/or contains lubricant to be provided to the gearbox 206. In this example, the lubricant reduces friction and/or wear of various components of the compressor 202. Additionally or alternatively, the lubricant can control engagement and disengagement of clutches associated with (e.g., positioned within) the gearbox 206. For example, the lubricant is moved by the lubricant pump 208 to operate the aforementioned clutches. In some examples, the lubricant pump 208 can implement an impeller, a vane, and/or a piston diaphragm to circulate the lubricant within the gearbox 206.

In the illustrated example, to filter lubricant provided to the lubricant pump 208, the gearbox 206 fluidly couples to and/or includes the filter 210. In particular, the example filter 210 removes particulate matter from the lubricant prior to the lubricant entering the gearbox 206.

Figure 3:
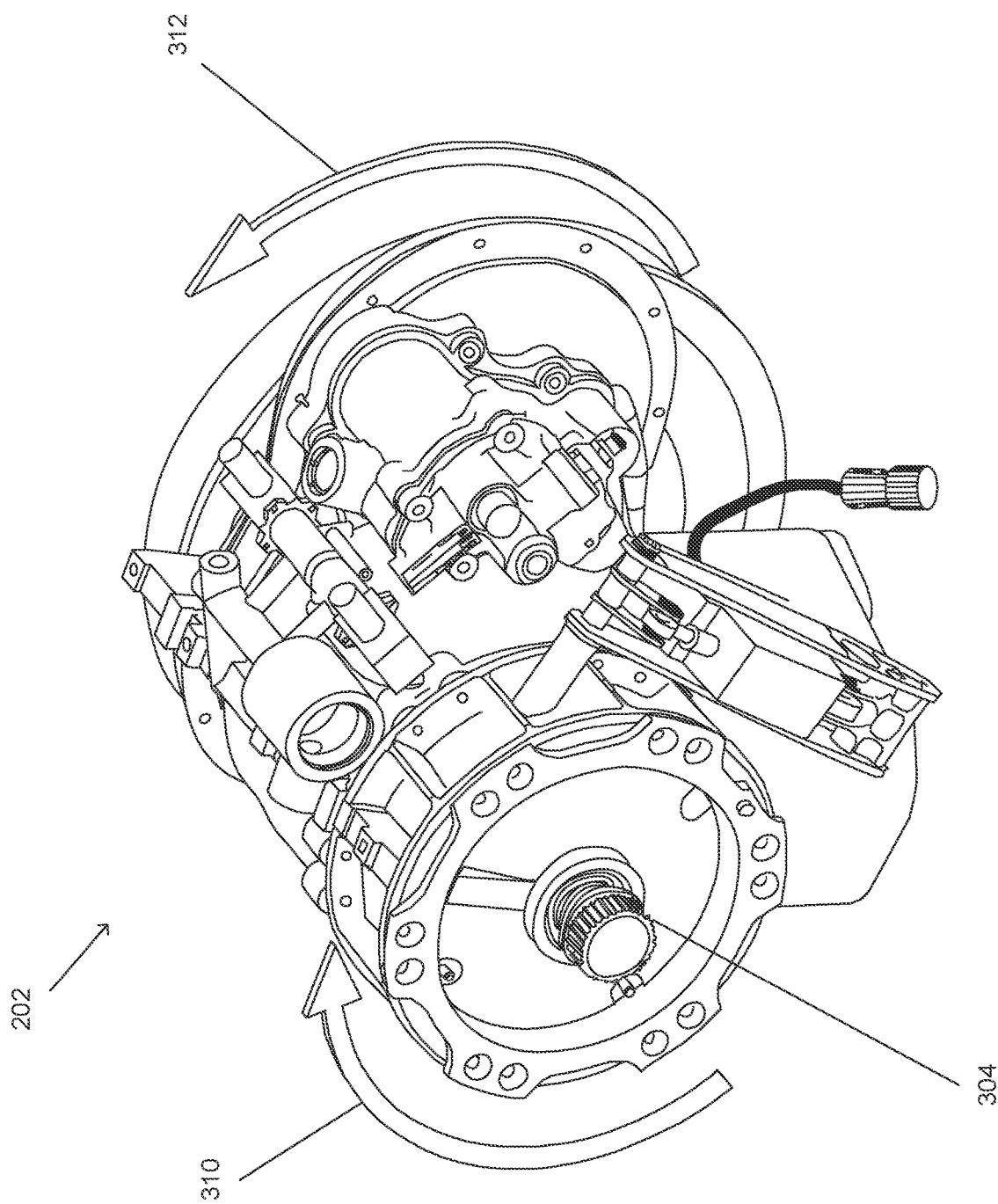
FIG. 3 is a perspective view of the example compressor shown in FIG. 2.

FIG. 3 is a perspective view of the example compressor 202 of FIG. 2. In the illustrated example, the compressor 202 includes an input shaft (e.g., a compressor shaft) 304, which is operatively coupled to the engine 112 shown in FIG. 1. In the illustrated example, the input shaft 304 rotates in a direction generally indicated by an arrow 310. Further, a direction of rotation of the compressor 202 is generally indicated by an arrow 312.

Figure 4:
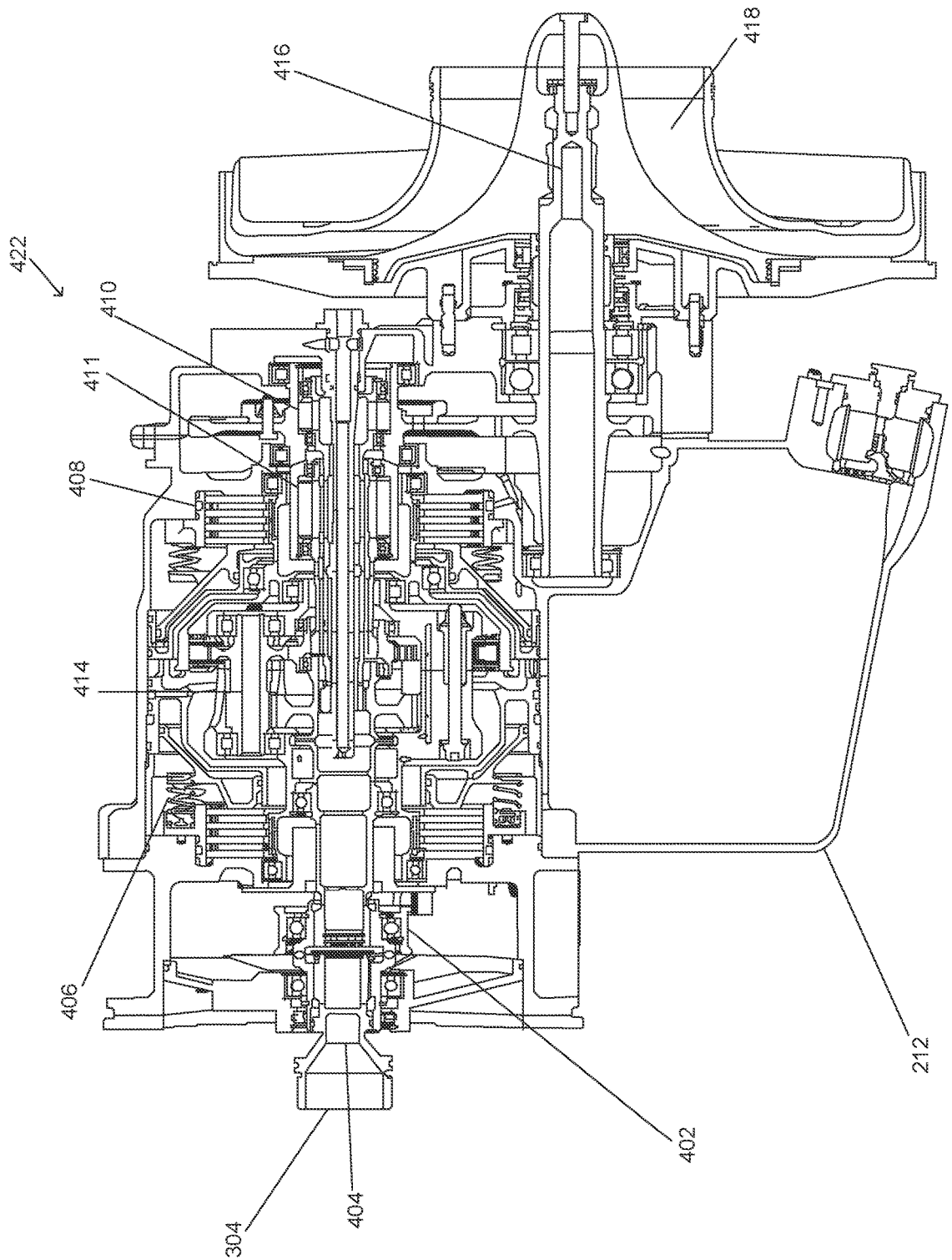
FIG. 4 is a cross-sectional view of the example compressor shown in FIGS. 2 and 3.

FIG. 4 is a cross-sectional view of the example compressor 202 shown in FIGS. 2 and 3. The compressor 202 of the illustrated example includes the lubricant reservoir 212, a disconnect (e.g., a disconnect mechanism) 402, an engine quill shaft 404, a carrier clutch 406, a ring gear clutch 408, first and second sprag clutches 410 and 411, the input shaft 304, a carrier 414, an output shaft 416, and a fluid channel 418. In this example, the ring gear clutch 408 and the carrier clutch 406 are friction clutches, and can be controlled via the aforementioned pressurized lubricant. Further, the example clutches 406, 408, 410, and 411 are part of a system of clutches 422 that controls the example compressor 202 described herein.

To disconnect and/or decouple the engine 112 from the compressor 202, the example disconnect 402 is operated in the event the aircraft 100 is not operating within specified parameters, for example. In other words, the disconnect 402 can act as a clutch to the compressor 202. In some examples, the disconnect 402 is operated and/or controlled based on a condition (e.g., an environmental condition within the fuselage 102). Additionally or alternatively, the disconnect 402 is spring-loaded, thereby decoupling the engine 112 from the compressor 202 when a spring associated with the disconnect 402 is displaced, for example.

In this example, to control and/or set a gear ratio of the gearbox 206, the first sprag clutch 410, the second sprag clutch 411, the carrier clutch 406, and the ring gear clutch 408 are operated. Particularly, different ones of the first sprag clutch 410, the second sprag clutch 411, the carrier clutch 406, and the ring gear clutch 408 are engaged or disengaged to control operation of the gearbox 206. In other words, a combination of engagement/disengagement states of the sprag clutches 410 and 411, the carrier clutch 406, and the ring gear clutch 408 is controlled to set the gear ratio. In this example, the gear ratio is set and/or controlled based on the operating condition of the aircraft 100. The operating condition can include, but is not limited to, takeoff, cruise, and landing. Further, each of the operating conditions can be associated with a respective rotational speed of the input shaft 304. In some examples, the gear ratio is set and/or controlled based on a set mode of the aircraft 100 (e.g., the aircraft 100 is set to a landing configuration, etc.).

In some examples, a low gear ratio (e.g., 1.65) of the gearbox 206 corresponds to takeoff of the aircraft 100 with engagement of the first sprag clutch 410. For example, the carrier clutch 406 and the ring gear clutch 408 are disengaged while the first sprag clutch 410 is engaged, thereby causing the first sprag clutch 410 to transfer power from the engine 112 to the compressor 202. In this example, during takeoff of the aircraft 100, a speed of the engine 112 is relatively high while the air is relatively dense. Accordingly, the compressor 202 does not require the speed of the input shaft 304 to be increased to a relatively high speed.

To place the gearbox 206 in a middle gear ratio (e.g., 2.89) for a cruise condition of the aircraft 101, the second sprag clutch 411 and the ring gear clutch 408 are engaged with the carrier clutch 406 disengaged, for example. As a result, during cruise of the aircraft 100, the carrier 414 rotates at a relatively fast speed, thereby causing an example planetary gear system 714 shown in FIG. 7 to experience relatively large forces. The forces encountered by the planetary gear system 714 are described in greater detail below in connection with FIG. 8.

In some examples, a high gear ratio (e.g., 4.07) of the gearbox 206 corresponds to descent of the aircraft 100 with engagement of the second sprag clutch 411 and the carrier clutch 406, while the ring gear clutch 408 is disengaged. For example, during this phase of flight, a speed of the engine 112 is decreased and the air is relatively less dense. Accordingly, the speed of the input shaft 304 can be insufficient to maintain necessary fluid characteristics of air entering the fuselage 102. Accordingly, the high gear ratio of the gearbox 206 can increase the speed of the input shaft 304.

Figure 5:
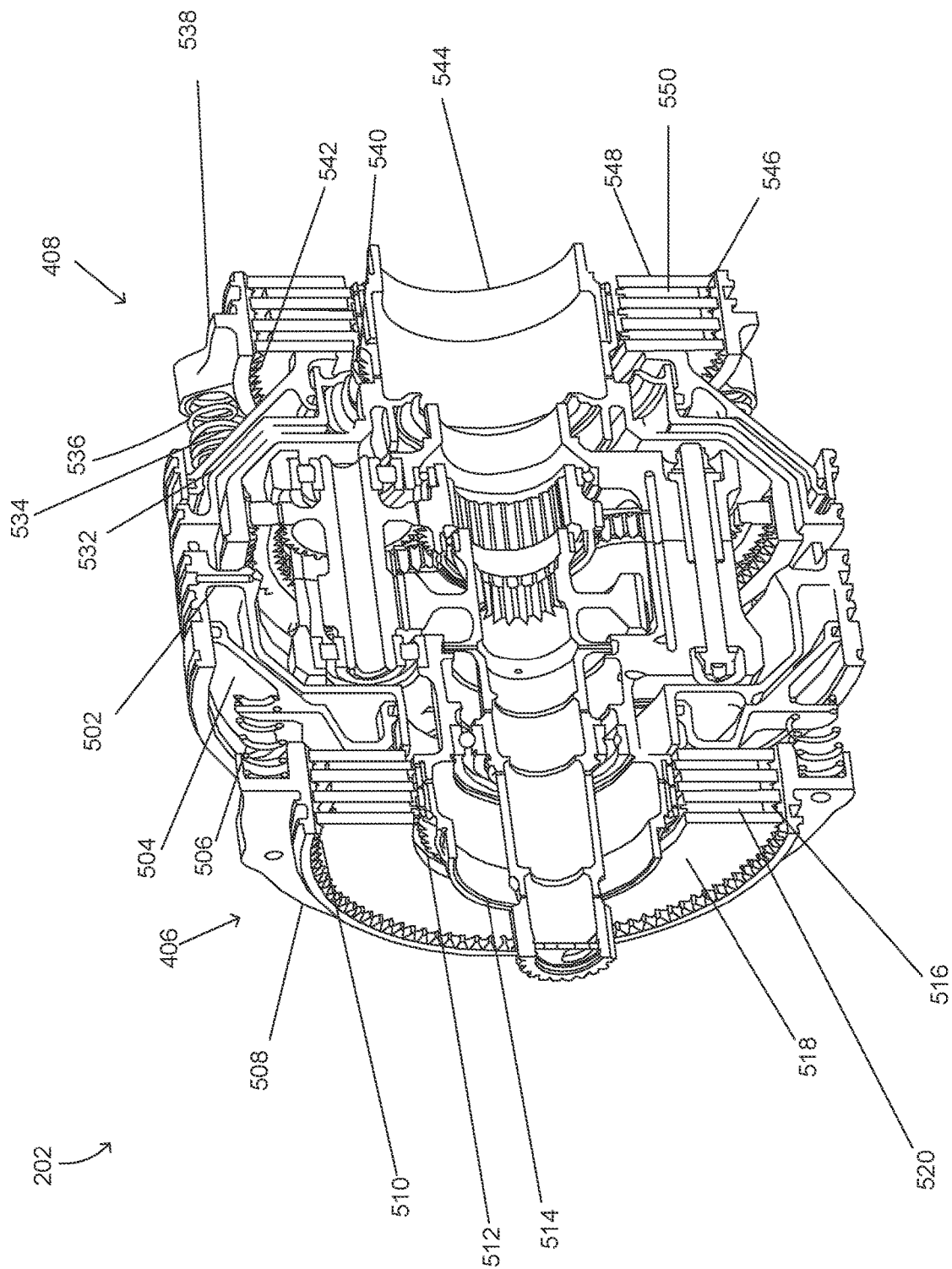
FIG. 5 is a perspective cross-sectional view of a portion of the example compressor shown in FIGS. 2-4.

FIG. 5 is a perspective cross-sectional view of a portion of the example compressor 202 shown in FIGS. 2-4. In the illustrated example, the carrier clutch 406 and the ring gear clutch 408 are shown. The example carrier clutch 406 includes a carrier cylinder 502, a carrier piston 504, carrier piston springs 506, a carrier reaction plate fitting 508, carrier reaction plate splines 510, carrier friction plate splines 512, a carrier shaft 514, carrier wave springs 516, carrier reaction plates 518, and carrier friction plates 520. The example ring gear clutch 408 of the illustrated example includes a ring gear cylinder 532, a ring gear piston 534, ring gear piston springs 536, a ring gear reaction plate fitting 538, ring gear reaction plate splines 542, ring gear friction plate splines 540, a ring gear shaft 544, ring gear wave springs 546, ring gear reaction plates 548, and ring gear friction plates 550.

In operation, the carrier clutch 406 is moved and/or controlled by the pressurized lubricant, for example. To enable engagement of the carrier clutch 406, the carrier clutch 406 includes the carrier friction plates 520 and the carrier reaction plates 518. In particular, the carrier reaction plates 518 and the carrier friction plates 520 exhibit a generally ring-like shape. In turn, to operatively couple the example carrier reaction plates 518 to the carrier reaction plate fitting 508, the example carrier reaction plates 518 include the carrier reaction plate splines 510 at their respective outer radii.

To operatively couple the carrier shaft 514 to the carrier friction plates 520, the example carrier friction plates 520 include the carrier friction plate splines 512 on their respective inner radii. In some examples, the carrier wave springs 516 separate the carrier friction plates 520 and the carrier reaction plates 518. Additionally, the carrier friction plates 520 and carrier reaction plates 518 may be arranged in an alternating pattern, such that each carrier friction plate 520 is positioned between ones of the carrier reaction plates 518.

In some examples, the ring gear clutch 408 is moved and/or controlled by the pressurized lubricant. To enable engagement of the example ring gear clutch 408, the ring gear clutch includes the ring gear friction plates 550 and the ring gear reaction plates 548. In this example, the ring gear reaction plates 548 and the ring gear friction plates 550 exhibit a generally ring-like shape. In turn, to operatively couple the example ring gear reaction plates 548 to the ring gear reaction plate fitting 538, the example ring gear reaction plates 548 include the ring gear reaction plate splines 542.

To operatively couple the ring gear shaft 544 to the ring gear friction plates 550, the ring gear friction plates 550 include the ring gear friction plate splines 540 on their respective inner radii. In some examples, the ring gear wave springs 546 separate the ring gear friction plates 550 and the ring gear reaction plates 548. Additionally, the ring gear friction plates 550 and ring gear reaction plates 548 may be arranged in an alternating pattern, such that each one of the ring gear friction plates 550 is positioned between ones of the ring gear reaction plates 548.

Figure 6A:
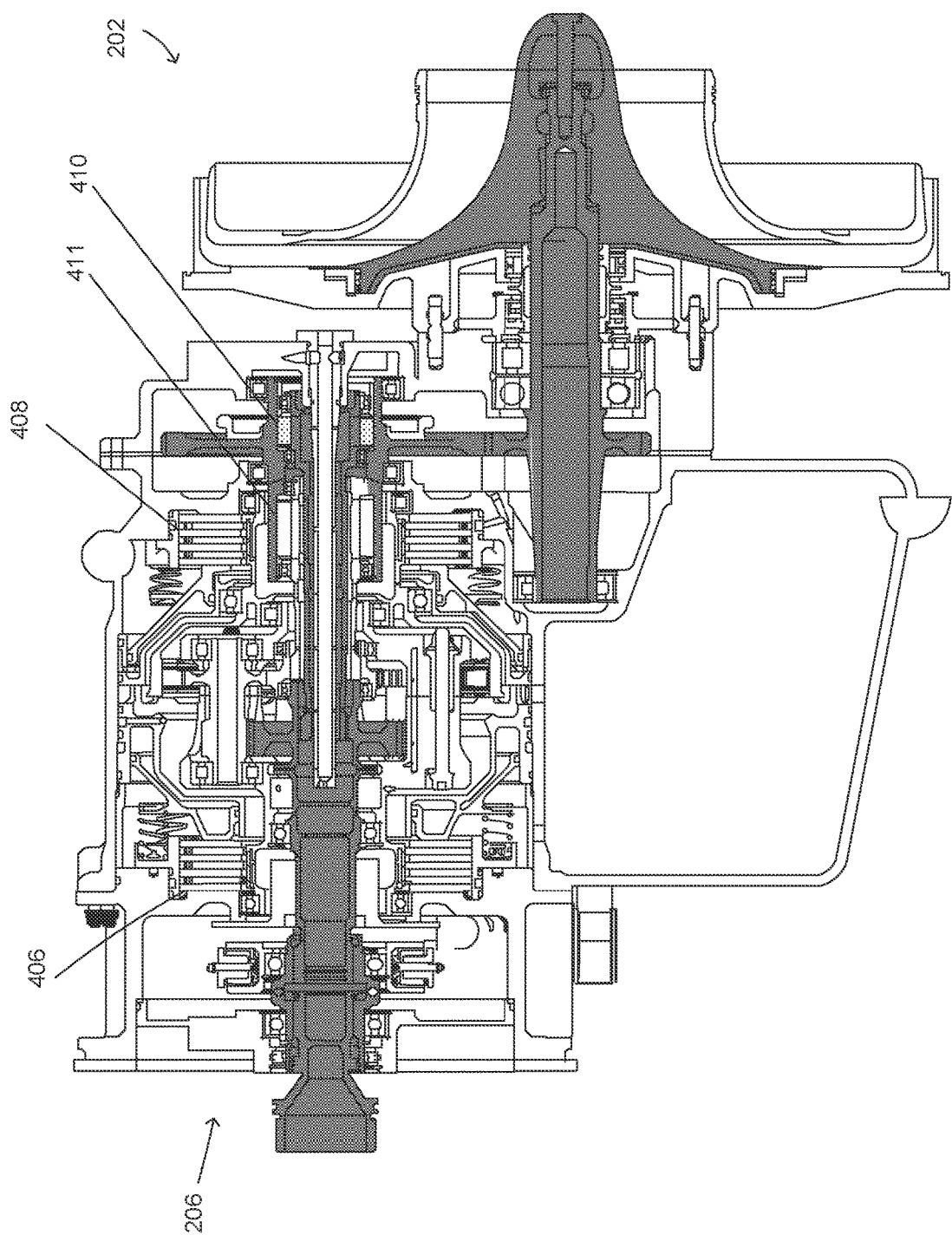
FIGS. 6A-6C illustrate example power paths of the example compressor shown in FIGS. 2-5.
Figure 6B:
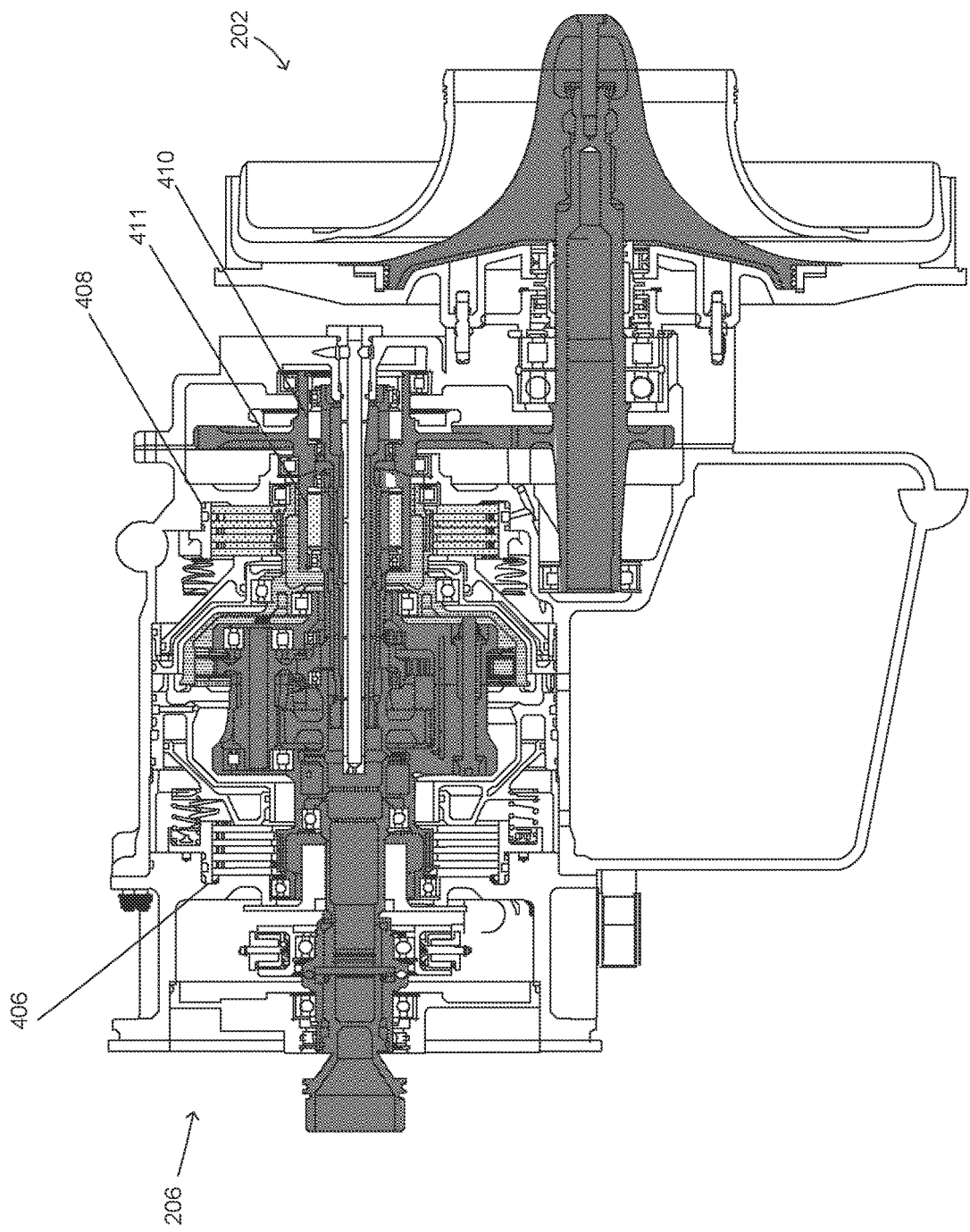
Figure 6C:
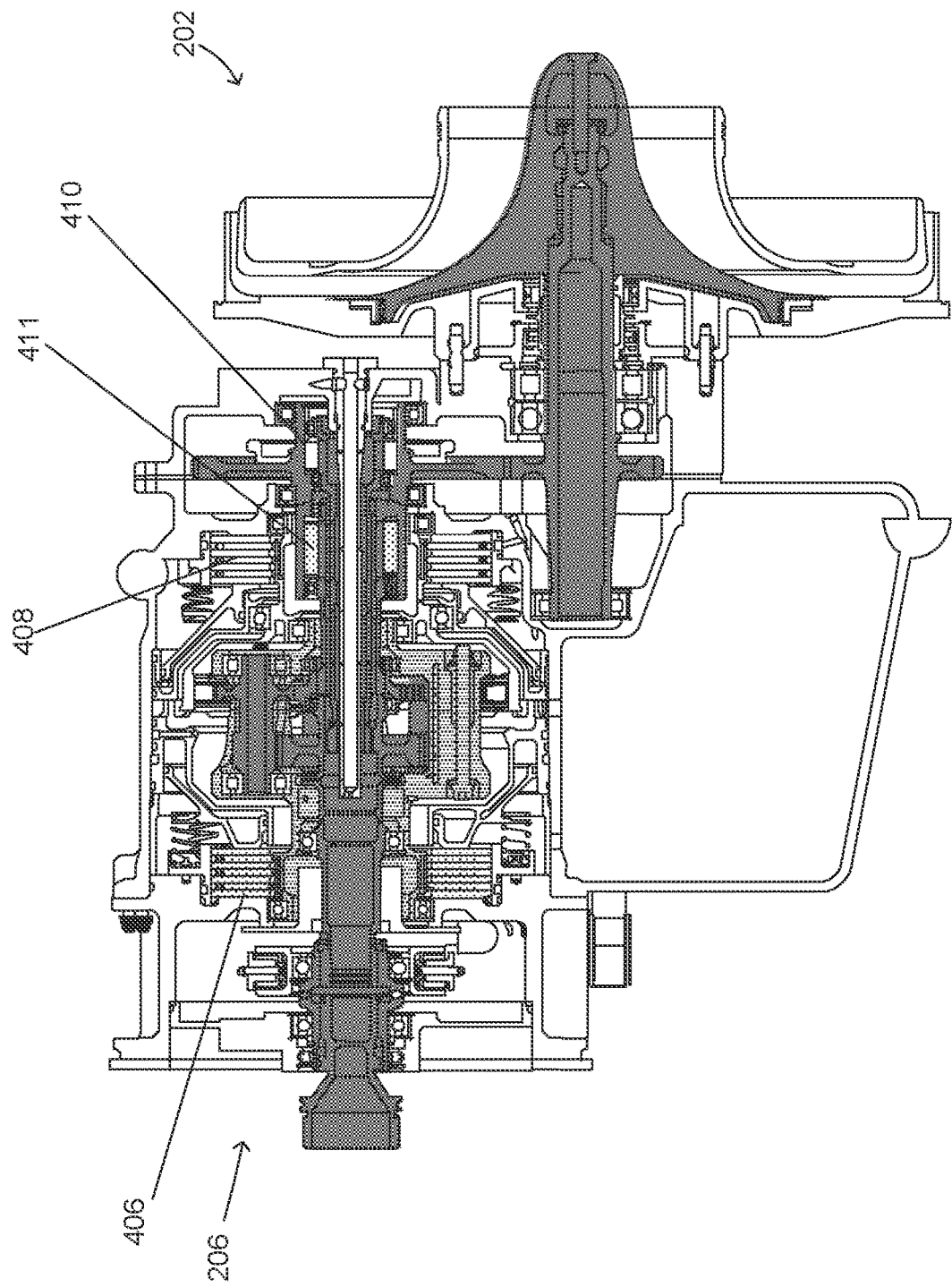

FIGS. 6A-6C illustrate example power paths of the example compressor 202. FIG. 6A illustrates example engagement of the gearbox 206 at the example low gear ratio (e.g., 1.65). To set the gearbox 206 at the example low gear ratio, the carrier clutch 406 and the ring gear clutch 408 are both disengaged while the first sprag clutch 410 is engaged.

FIG. 6B illustrates example engagement of the gearbox 206 at the example middle gear ratio (e.g., 2.89). At the example middle gear ratio, the carrier clutch 406 is disengaged, while the ring gear clutch 408 and the second sprag clutch 411 are engaged.

FIG. 6C illustrates example engagement of the gearbox 206 at the example high gear ratio (e.g., 4.07). In the illustrated example, the high gear ratio corresponds to the ring gear clutch 408 being disengaged while the carrier clutch 406 and the second sprag clutch 411 are engaged.

Figure 7:
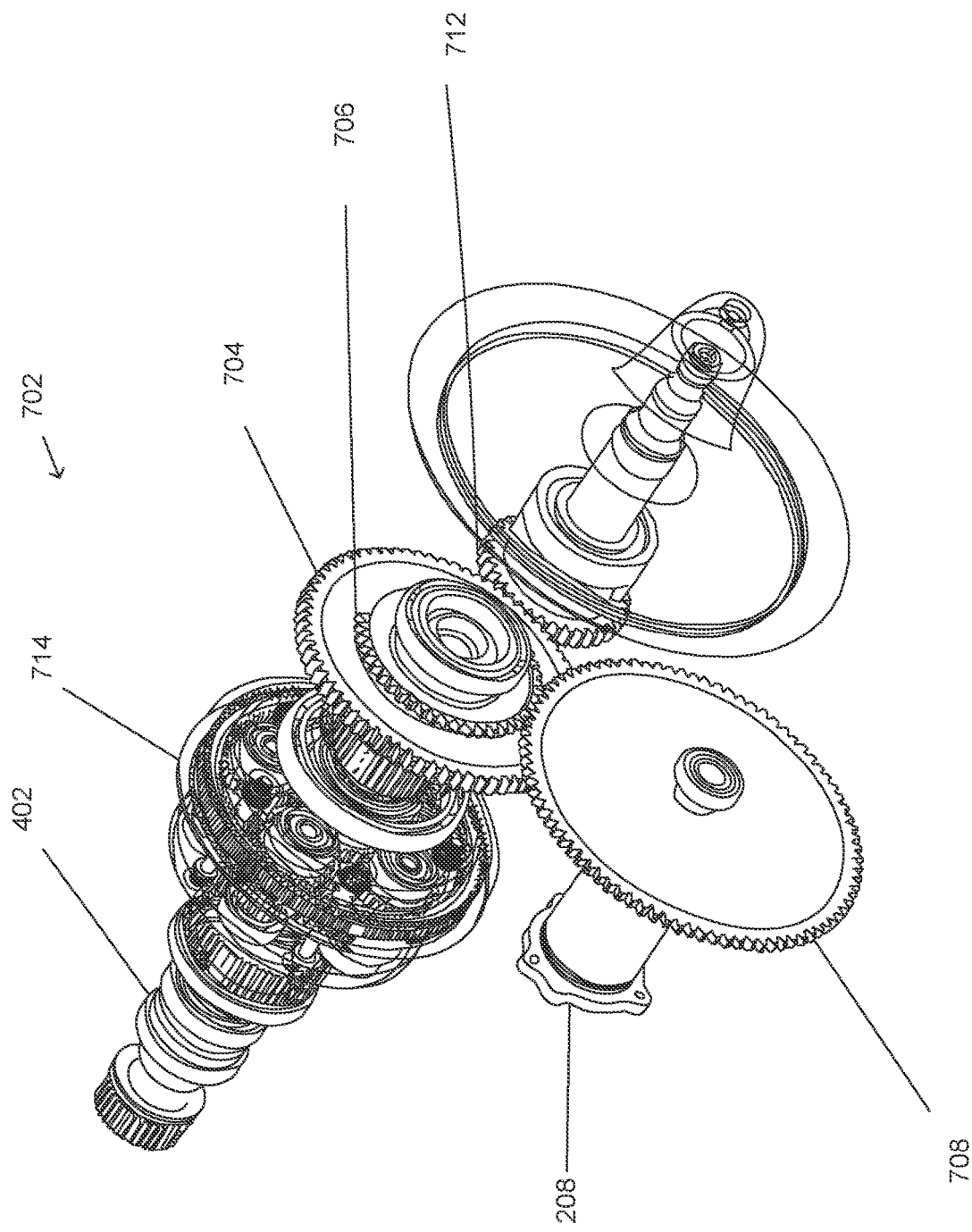
FIG. 7 illustrates an example powertrain layout that can be implemented in examples disclosed herein.

FIG. 7. illustrates an example powertrain layout 702 that can be implemented in examples disclosed herein. The powertrain layout 702 of the illustrated example includes the disconnect mechanism 402, the lubricant pump 208, a compressor gear 704, a lubricant pump pinion 706, a lubricant pump gear 708, a compressor pinion 712, and the aforementioned planetary gear system 714.

In the illustrated example, in operation, the planetary gear system 714 is to deliver power from the engine 112 to the lubricant pump 208 and the compressor 202, as seen in FIG. 2. Accordingly, the planetary gear system 714 may be controlled by the carrier clutch 406 and the ring gear clutch 408 shown in FIGS. 4-6C. Further, the compressor gear 704 is operatively coupled to the compressor pinion 712 for transferring power to the compressor 202. In some examples, the powertrain 702 also includes the lubricant pump pinion 706 to be operatively coupled to the lubricant pump gear 708. In some such examples, the lubricant pump 208 receives power from the powertrain 702 to provide lubricant throughout the gearbox 206 shown in FIG. 2. Additionally or alternatively, the disconnect mechanism 402 can decouple the engine from the powertrain 702.

Figure 8:
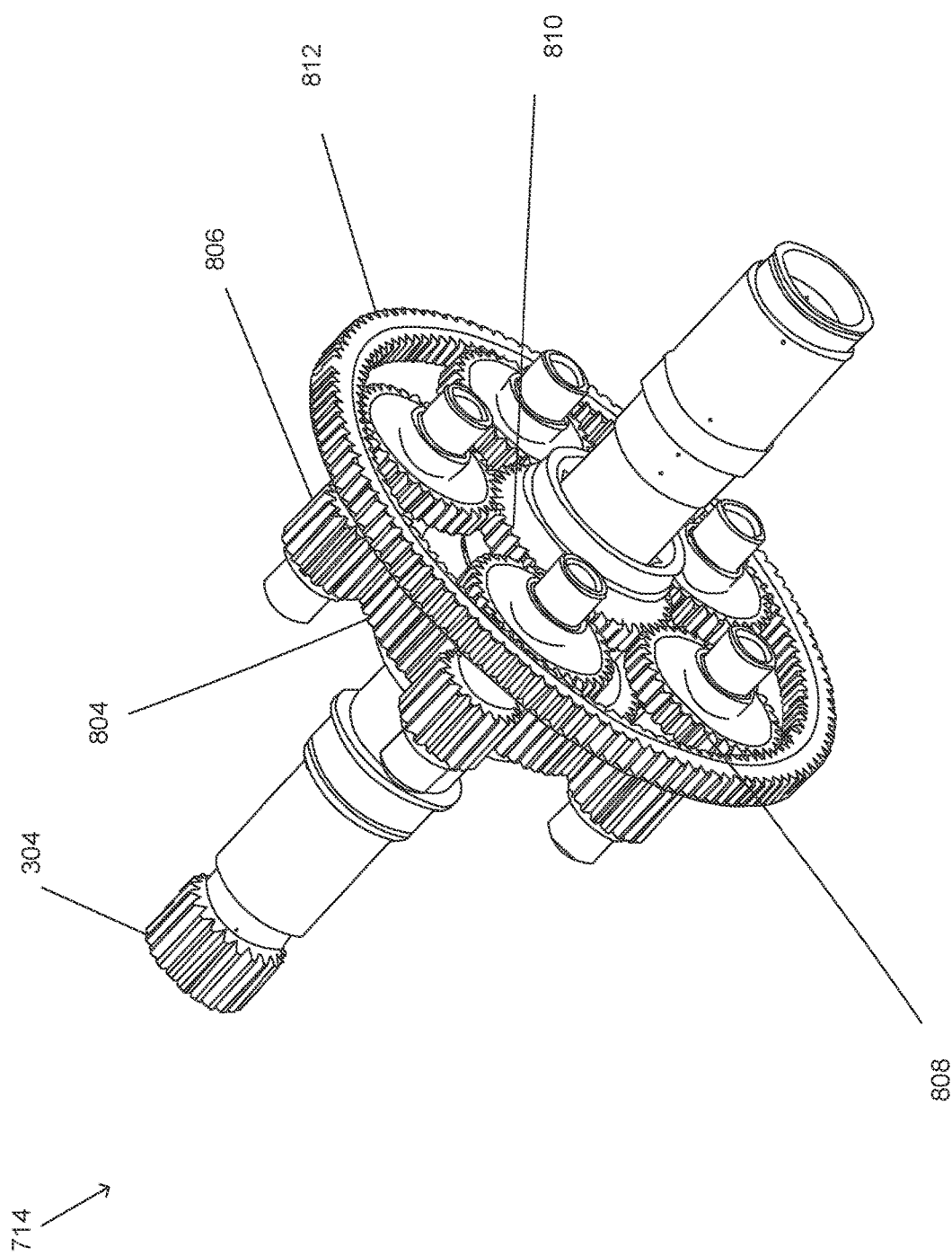
FIG. 8 is a detailed view of an example planetary gear system that can be implemented in examples disclosed herein.

FIG. 8 illustrates the example planetary gear system 714 that can be implemented in examples disclosed herein. The example planetary gear system 714 includes a first stage sun gear 804, first stage planet gears 806, second stage planet gears 808, a second stage sun gear 810, and a ring gear 812.

In operation, the planetary gear system 714 couples the input shaft 304 and the output shaft 416 of the compressor 202 (FIGS. 2-4), thereby increasing the speed of the output shaft 416. In this example, the input shaft 304 rotates the first stage sun gear 804 and, in turn, the first stage sun gear 804 rotates the first stage planet gears 806 and, consequently, the carrier 414 (omitted from FIG. 8 for clarity). In some examples, rotation of the first stage planet gears 806 causes rotation of the second stage planet gear through common shaft connection. Additionally, or alternatively, the first stage planet gears 806 may be coupled to the second stage planet gear 808, which rotates around an interior radius of the ring gear 812. In some examples, the second stage planet gears 808 can also be operatively coupled to the second stage sun gear 810. As described above in connection with FIGS. 4-6C, the carrier clutch 406 and the ring gear clutch 408 (or any other clutch(es)) can be engaged or disengaged in the different combinations to alter the gear ratio of the planetary gear system 714.

Figure 9A:
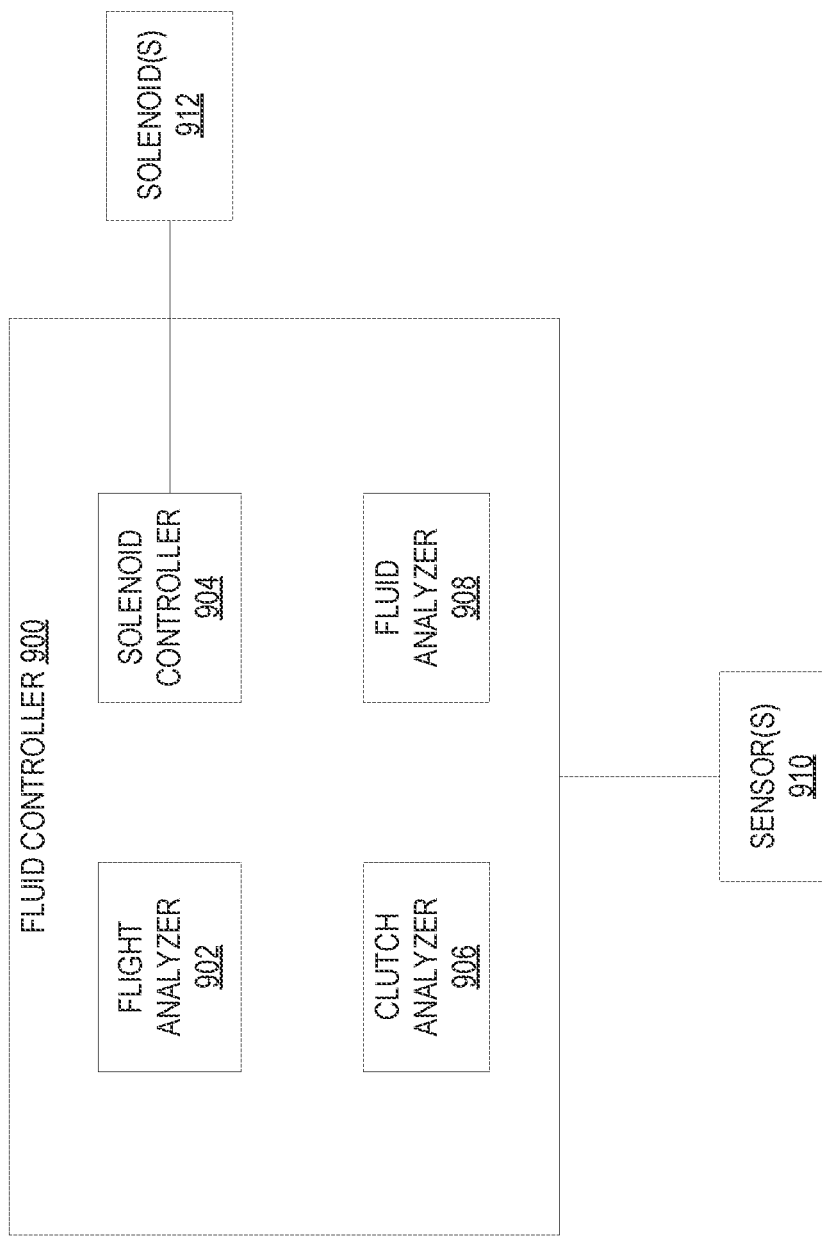
FIG. 9A is a block diagram of an example fluid controller that can be implemented in examples disclosed herein.

FIG. 9A is a block diagram illustrating an example fluid controller 900 that can be implemented in examples disclosed herein. The example fluid controller 900 includes a flight analyzer 902, a solenoid controller 904, a clutch analyzer 906, and a fluid analyzer 908. Further, in some examples, the fluid controller 900 is communicatively coupled to sensor(s) 910 and/or solenoid(s) 912.

In the illustrated example, the flight analyzer 902 categorizes, receives, queries and/or determines a flight condition of the aircraft 100 based on flight information (e.g., sensor information, flight mode data, flight setting information), which may be received from the sensor(s) 910. The sensor(s) 910 can be positioned throughout the aircraft 100 and/or the engine 112. For example, the sensor(s) 910 may be placed within the engine 112, the wings 104, the control surfaces 109, and/or operatively coupled to a lubrication system (e.g., a pressurized lubrication system) 1102 shown below in connection with FIG. 11. In this example, the flight information is provided to the clutch analyzer 906, the solenoid controller 904, and the fluid analyzer 908.

The example solenoid controller 904 controls the solenoid(s) 912 to vary an amount of flow of pressurized lubricant to the ring gear clutch 406 and the carrier clutch 408, for example.

The example fluid analyzer 908 processes and/or analyzes flight and/or aircraft information from the sensor(s) 910. The clutches 406, 408, 410, and 411 may be controlled based on an operating condition of the aircraft 100 determined from the information.

In some examples, the example clutch analyzer 906 may determine whether the clutches 406, 408, 410, and 411 are operating appropriately (e.g., disengaged or engaged) and/or within a specified operating parameter. For example, the clutch analyzer 906 can utilize sensor data from the sensor(s) 910 to determine whether the clutches 406, 408, 410, and 411 are engaged or disengaged. In some examples, the clutch analyzer 906 determines a combination of engagement/disengagement states of the clutches 406, 408, 410, and 411 appropriate for the aforementioned operating condition.

While an example manner of implementing the fluid controller 900 is illustrated in FIG. 9A, one or more of the elements, processes and/or devices illustrated in FIG. 9A may be combined, divided, re-arranged, omitted, eliminated and/or implemented in any other way. Further, the example flight analyzer 902, the example solenoid controller 904, the example clutch analyzer 906, the example fluid analyzer 908 and/or, more generally, the example fluid controller 900 of FIG. 9A may be implemented by hardware, software, firmware and/or any combination of hardware, software and/or firmware. Thus, for example, any of the example flight analyzer 902, the example solenoid controller 904, the example clutch analyzer 906, the example fluid analyzer 908 and/or, more generally, the example fluid controller 900 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flight analyzer 902, the example solenoid controller 904, the example clutch analyzer 906, and/or the example fluid analyzer 908 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fluid controller 900 of FIG. 9A may include one or more elements, processes and/or devices in addition to, or instead of, those illustrated in FIG. 9A, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9B:
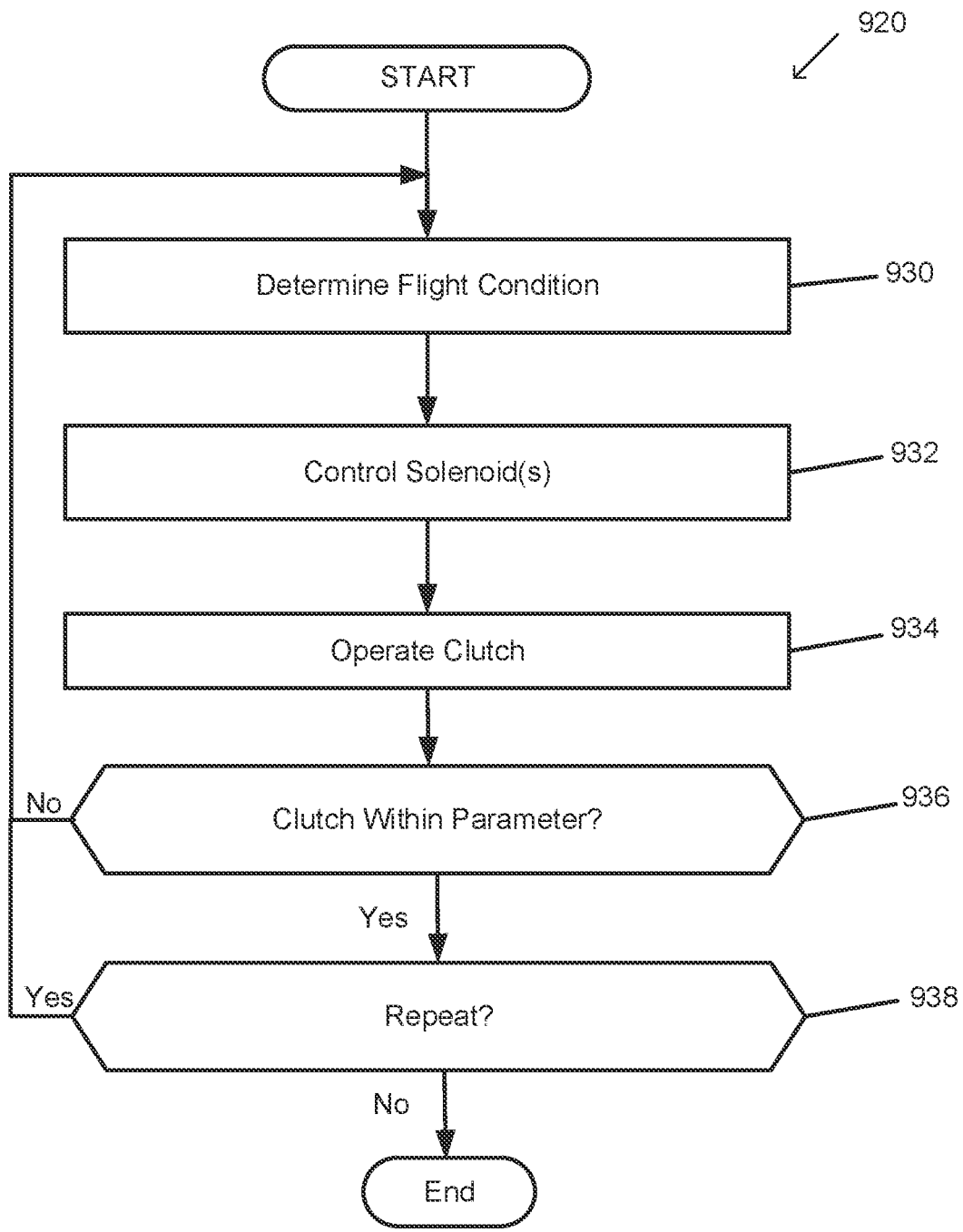
FIG. 9B is a flowchart representative of an example method to implement examples disclosed herein.

A flowchart representative of example hardware logic, machine readable instructions, hardware implemented state machines, and/or any combination thereof for implementing the fluid controller 900 of FIG. 9A is shown in FIG. 9B. The machine readable instructions may be one or more executable programs or portion(s) of an executable program for execution by a computer processor and/or processor circuitry, such as the processor 1512 shown in the example processor platform 1500 discussed below in connection with FIG. 9B. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 9B, many other methods of implementing the example fluid controller 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 9B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9B is a flowchart representative of an example method 920 that may be implemented in conjunction with the example compressor 202 and/or a control system, such as the example fluid controller 900 shown in FIG. 9A.

At block 930, the flight analyzer 902 determines a flight condition, a fluid condition, and/or a clutch condition of the aircraft 100. In this example, the flight condition includes a flight mode of the aircraft, such as whether the aircraft 100 is undergoing takeoff, cruise, and landing, for example. However, any other appropriate flight conditions and/or aircraft settings can be implemented instead. Further, any appropriate gear ratios of the compressor 202 and/or the gearbox 206 can be implemented instead. For example, the flight condition can be related to air conditions, air speed, elevation changes, etc.

At block 932, in some examples, the solenoid controller 904 controls solenoid valves 1202 shown below in connection with FIG. 12. In this example, the solenoid valves 1202 are controlled based on the current operating condition of the aircraft 100.

In turn, at block 934, the solenoid controller 904 and/or the clutch analyzer 908 control the clutches 406, 408, 410, and 411 shown in FIG. 4. In some examples, the solenoid controller 904 and/or the clutch analyzer 906 control the solenoid valves 1202 to vary a pressurized flow of lubricant to actuate or disengage the clutches 406, 408, 410, and 411 of FIG. 4.

At block 936, in this example, the fluid analyzer 908 and/or the clutch analyzer 906 compare data from the sensor(s) 910 to predefined operating parameters to determine whether the clutches 406, 408, 410, and 411 of FIG. 4 are operating within parameter(s) associated with the flight condition (e.g., whether ones of the clutches 406, 408, 410, and 411 are correctly engaged or disengaged based on the flight condition). If at least one of the clutches 406, 408, 410, and 411 is not operating within the parameter(s) (block 936), the process returns to block 930. Otherwise, the process proceeds to block 938.

At block 938, it is determined whether to repeat the process. If the process is to be repeated (block 938), control of the process returns to block 930. Otherwise, the process ends. This determination may be based on whether the flight condition has or is going to change (e.g., the aircraft 100 is transitioning to a landing/descent configuration).

Figure 10:
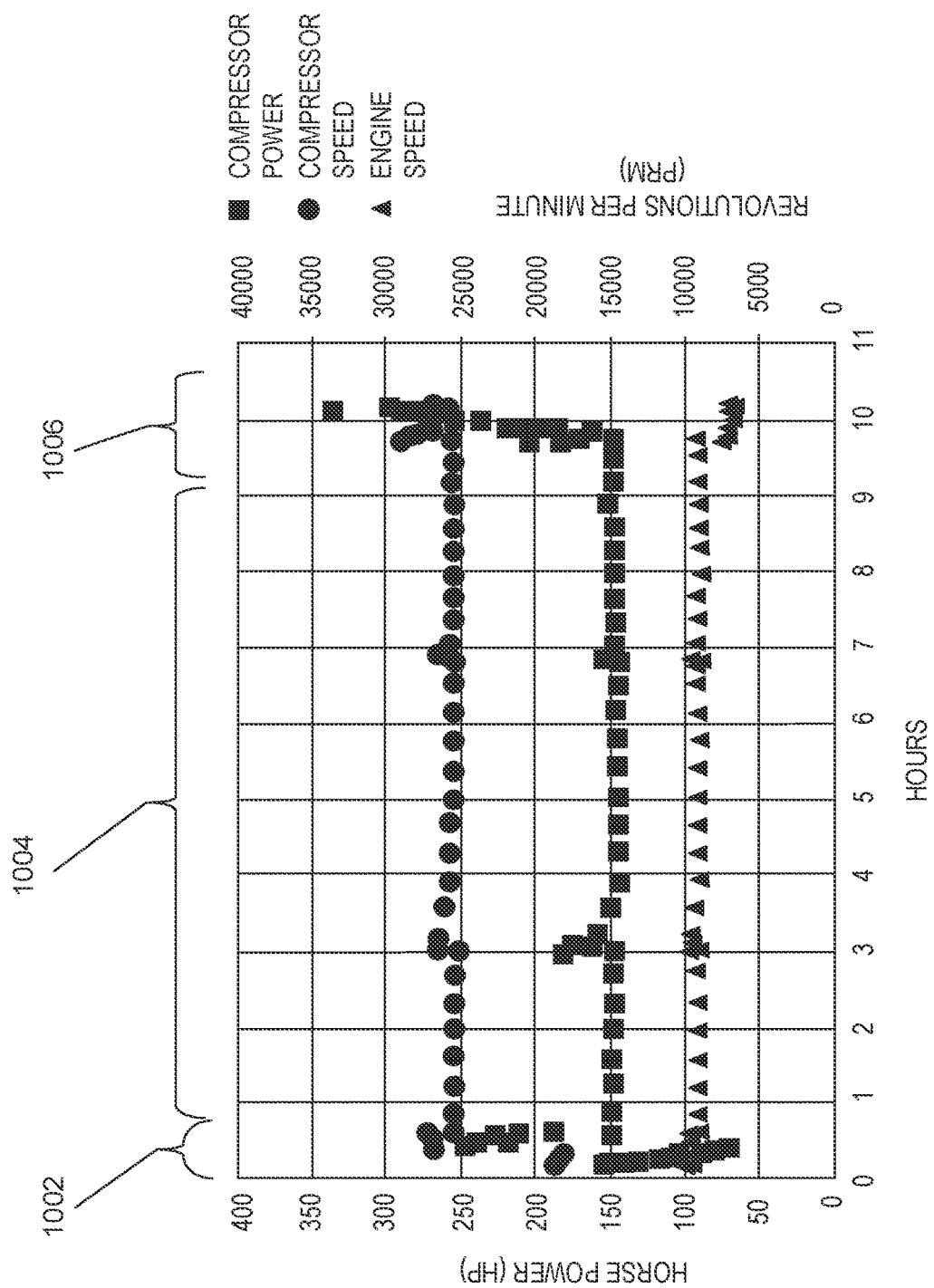
FIG. 10 is a graph representative of an example relationship between compressor power, compressor speed, and engine speed.

FIG. 10 is a graph representative of an example relationship between compressor power, compressor speed, and engine speed associated with examples disclosed herein. In the illustrated example, a region 1002 indicates the low gear ratio of the compressor 202. In the example region 1002, the compressor spends a relatively smaller portion of time in this phase. Further, a region 1004 indicates the middle gear ratio while a region 1006 indicates the high gear ratio, which corresponds to a greater compressor power and lower engine speed. Accordingly, examples disclosed herein enable the compressor 202 to operate effectively with significantly different power scenarios of the engine 112.

Figure 11:
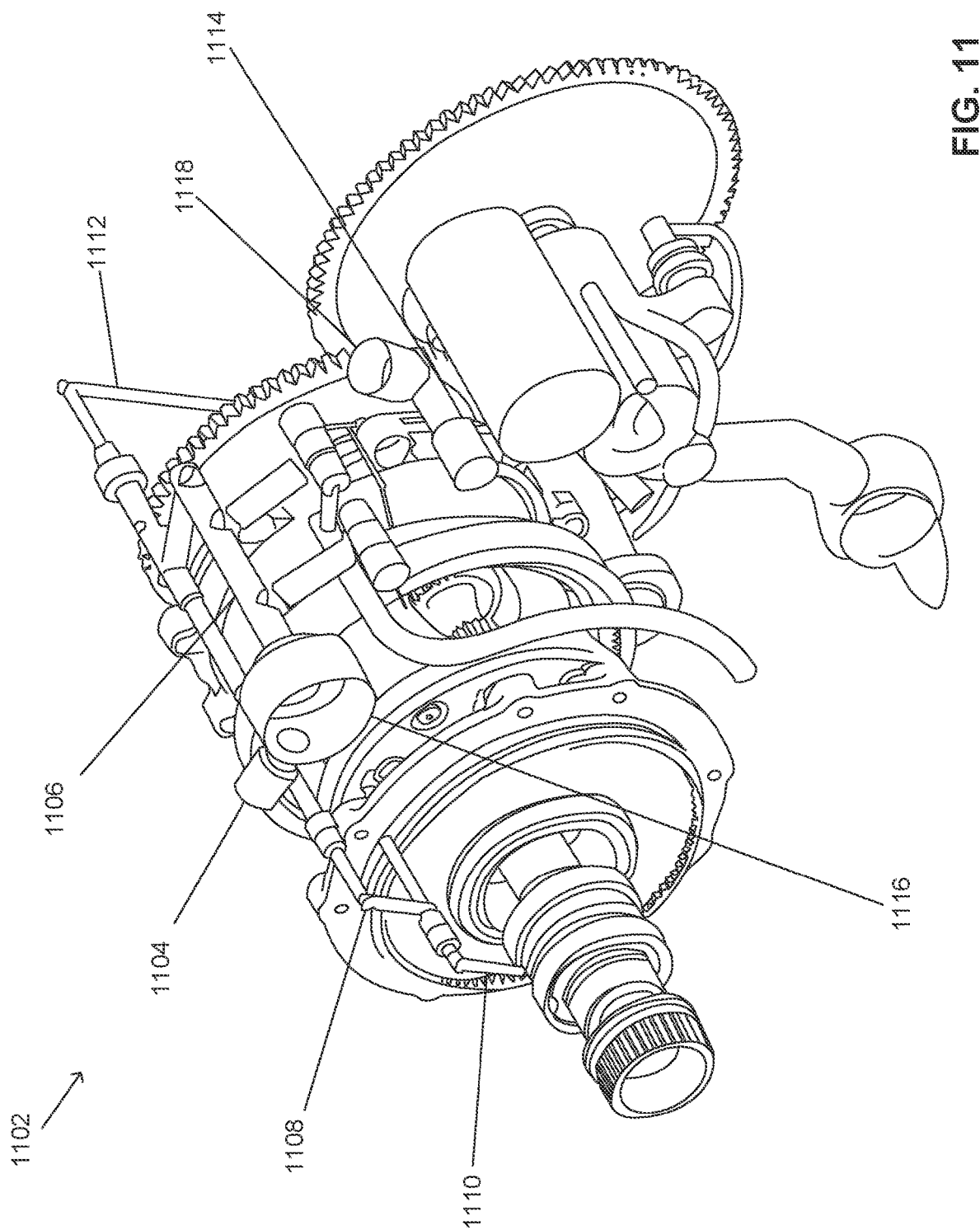
FIG. 11 illustrates an example lubrication system that can be implemented in examples disclosed herein.

FIG. 11 illustrates the aforementioned example lubrication system 1102 that can be implemented in examples disclosed herein. The example lubrication system 1102 includes a lubrication inlet 1104, a main housing passage 1106, a disconnect housing passage 1108, a disconnect retainer passage 1110, an output cover passage 1112, a lubrication manifold passage 1114, an inlet filter 1116, and a lubrication outlet 1118.

To provide lubricant to the gearbox 206, the lubrication system 1102 receives lubricant at the lubrication inlet 1104. In this example, the lubricant passes through the inlet filter 1116 to remove particulate from the lubricant. The filtered lubricant is then provided to the example solenoid valves 1204 and 1206 of FIGS. 12-14 at a relatively high pressure. Further, the filtered lubricant is also provided to rotating components of the gearbox 206 of FIG. 2 via the main housing passage 1106. Additionally or alternatively, the lubrication system 1102 may include fluid flow detection circuitry, a pressure sensor, and/or a temperature switch to provide feedback to the example fluid controller 900 corresponding to operation (e.g., an operational state) of the lubrication system 1102.

Figure 12:
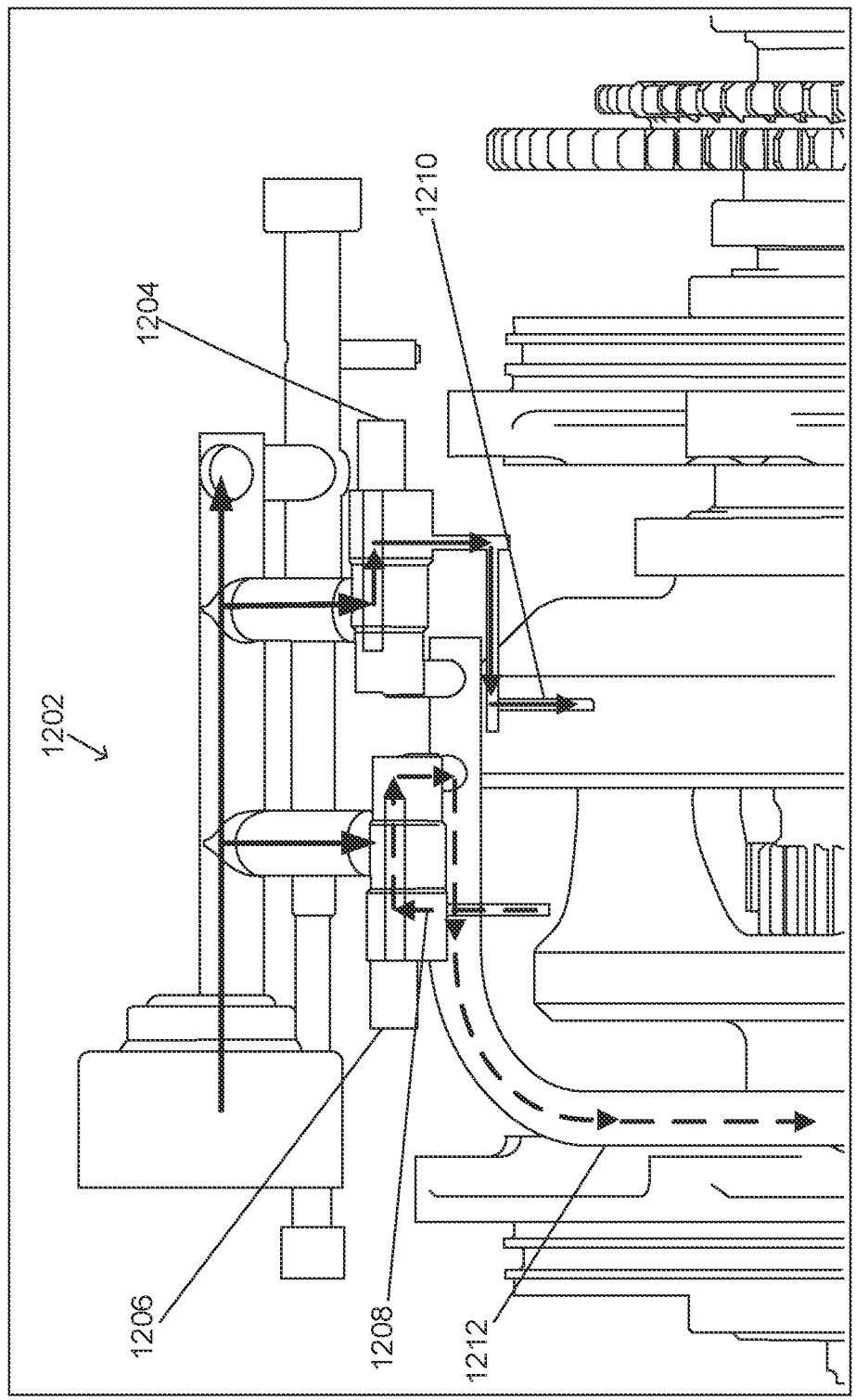
FIGS. 12-14 illustrate example solenoid control system states that can be implemented in examples disclosed herein.
Figure 13:
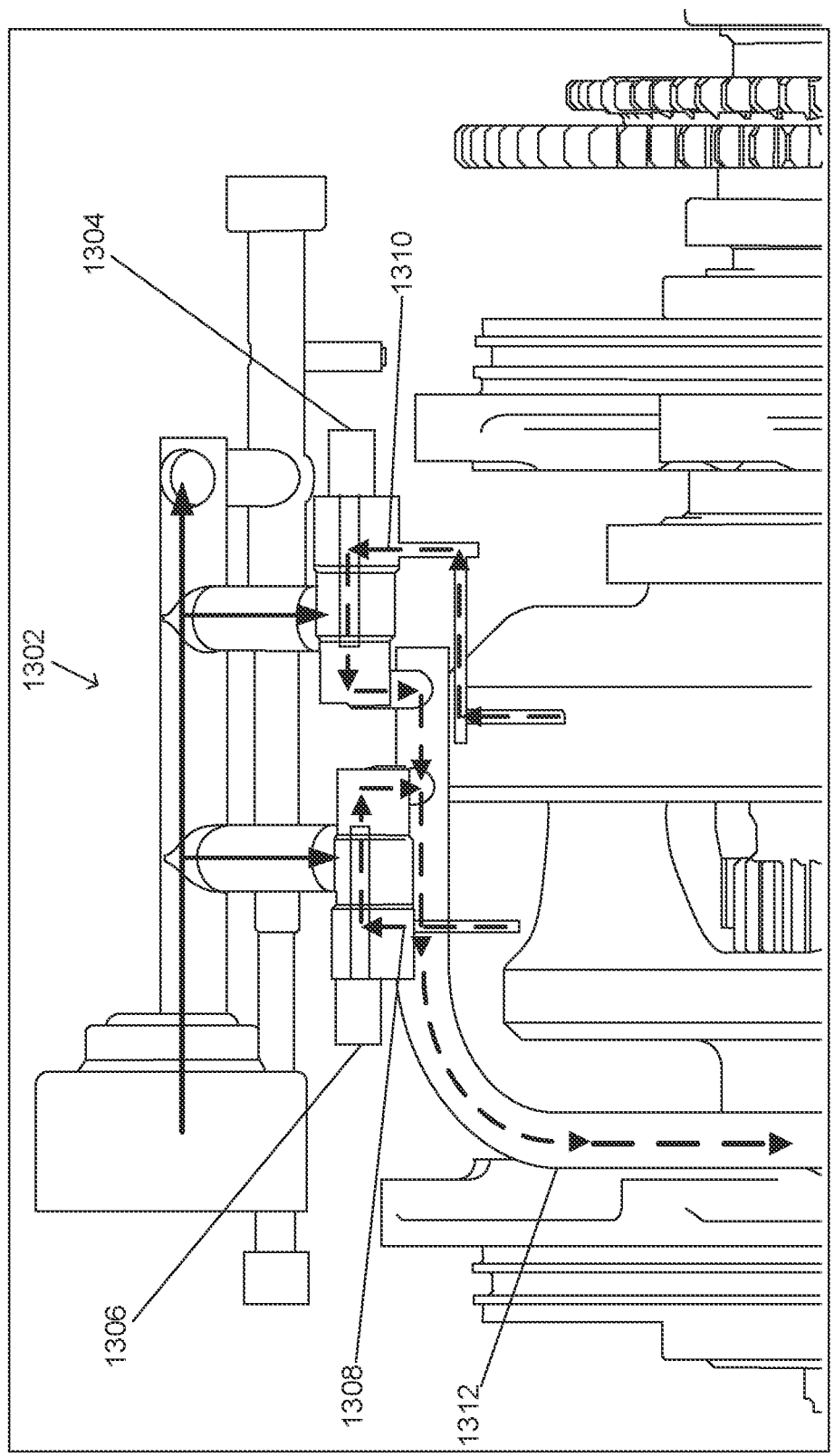
Figure 14:
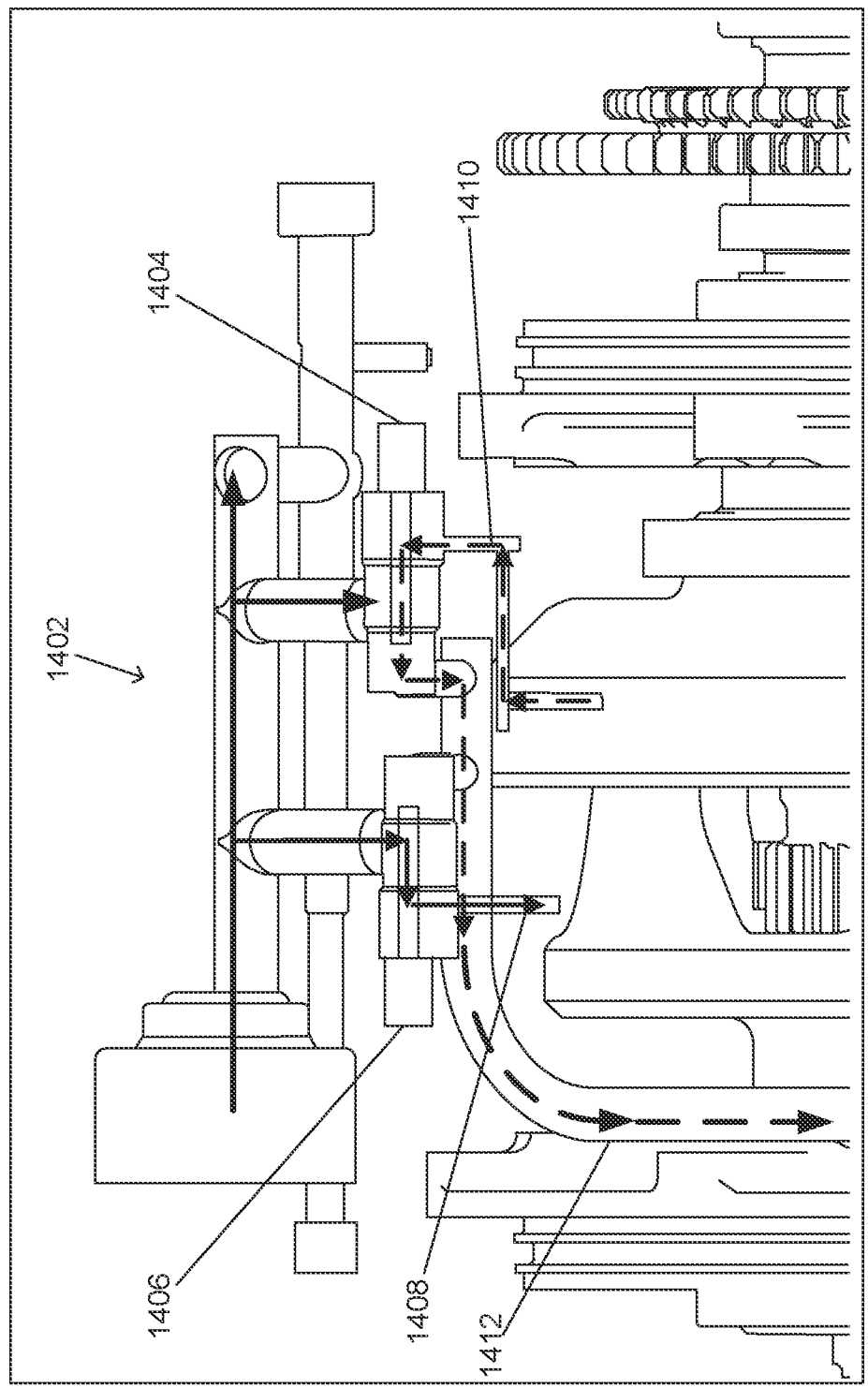

FIGS. 12-14 illustrate example solenoid control states that can be implemented in examples disclosed herein. FIG. 12 illustrates an example configuration of the solenoid valves 1202 for an example middle gear ratio. In this example, an aft valve 1204 is open, thereby engaging the ring gear 812 of FIG. 8 via a flow of pressurized lubricant, as generally shown by arrow 1210. Additionally, the forward valve 1206 is closed. In turn, the carrier 414 of FIG. 4 is disengaged and, as a result, a low pressure flow is provided to a scavenge line 1212, as generally indicated by an arrow 1208, for example. In this example, the ring gear clutch 408 of FIG. 4 is engaged, thereby preventing movement of the ring gear 812 of FIG. 8.

FIG. 13 illustrates an example configuration of solenoid valves 1302 for an example low gear ratio. In this example, an aft valve 1304 and a forward valve 1306 are closed. Additionally, in this example, the clutches 406 and 408 shown in FIG. 4 are not engaged. In turn, as generally indicated by arrows 1308 and 1310, the clutches 406 and 408 of FIG. 4 provide lubricant to the lubricant reservoir 212 of FIG. 2.

FIG. 14 illustrates an example configuration of solenoid valves 1402 for an example high gear ratio. In this example, the aft valve 1404 is closed while the forward valve 1406 is open. As a result, the ring gear clutch 408 of FIG. 4 is disengaged and lubricant flows at a relatively low pressure to a scavenge line 1412, as generally indicated by an arrow 1410. Additionally, in this example, the carrier clutch 406 of FIG. 4 is engaged, thereby preventing movement of the carrier 414.

Figure 15:
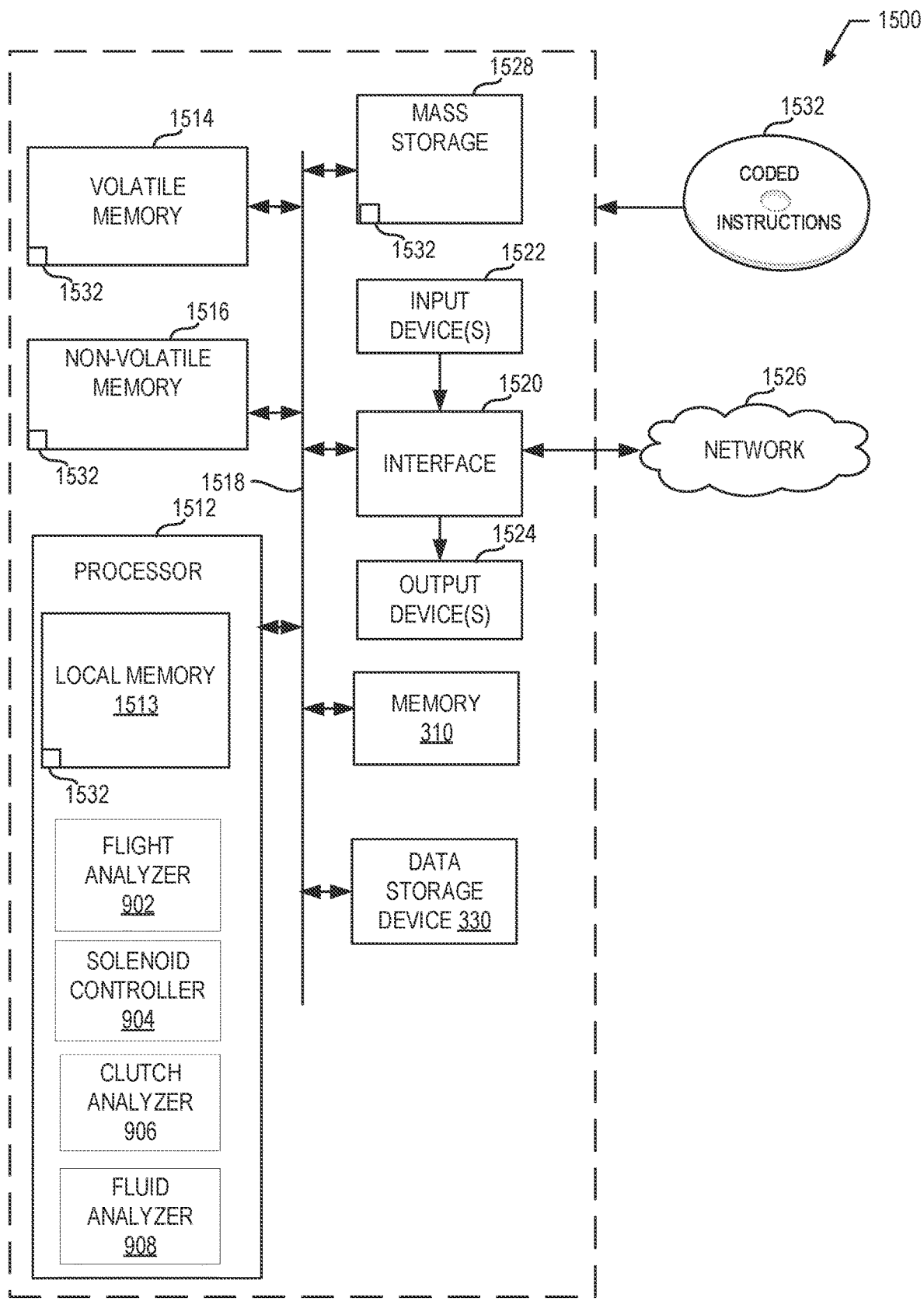
FIG. 15 is a block diagram of an example processing platform structured to execute the instructions of FIG. 9B to implement the example compressor of FIG. 2 and/or the example fluid controller of FIG. 9A.

FIG. 15 is a block diagram of an example processor platform 1500 structured to execute the instructions of FIG. 9B to implement the fluid controller 900 of FIG. 9A The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight analyzer 902, the example solenoid controller 904, the example clutch analyzer 906, and the example fluid analyzer 908.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 9B may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that relate to an example gearbox with multiple gear ratios that may maintain a shaft speed of a compressor.

Example 1 includes an apparatus. The apparatus includes a fluid channel to convey a fluid, a compressor fluidly coupled to the fluid channel, a gearbox operatively coupled to the compressor, the gearbox to control the compressor using a first gear ratio and a second gear ratio different from the first gear ratio to vary a flow rate of fluid in the fluid channel, and clutches to vary the gearbox between the first gear ratio and the second gear ratio.

Example 2 includes the apparatus of example 1, further including a controller operatively coupled to the clutches to control the gearbox between the first and second gear ratios based on an aircraft operating condition.

Example 3 includes the apparatus of any of examples 1 or 2, wherein the controller controls the gearbox to maintain a shaft speed associated with a shaft of the compressor to maintain a desired air flow to a cabin of an aircraft.

Example 4 includes the apparatus of any of examples 1 to 3, further including a lubrication system to control at least one of the clutches.

Example 5 includes the apparatus of example 4, wherein the lubrication system includes at least one solenoid valve to control a flow of a lubricant to direct engagement or disengagement of the clutches.

Example 6 includes the apparatus of any of examples 4 or 5, wherein the lubrication system is to provide lubricant to the gearbox.

Example 7 includes the apparatus of any of examples 1 to 6, wherein the gearbox includes a planetary gear.

Example 8 includes the apparatus of any of examples 1 to 7, wherein the first gear ratio corresponds to engagement of a first sprag clutch, and wherein the second gear ratio corresponds to engagement of a second sprag clutch and a ring gear clutch.

Example 9 includes the apparatus of any of examples 1 to 8, wherein the gearbox further includes a third gear ratio corresponding to engagement of the second sprag clutch and a carrier clutch.

Example 10 includes the apparatus of any of examples 1 to 9, wherein the clutches include a sprag clutch, a carrier clutch, and a ring gear clutch.

Example 11 includes the apparatus of any of claims 1 to 10, further including a piston and a stator, wherein at least one of the piston or the stator is non-rotatable.

Example 12 includes an example aircraft engine. The aircraft engine includes a fluid channel having an inlet and outlet, and a compressor. The compressor includes a gearbox having a first gear ratio and a gear second ratio different from the first gear ratio, and clutches to control the gearbox between the first gear ratio and the second gear ratio to vary a flow rate of fluid in the fluid channel.

Example 13 includes the aircraft engine of example 12, further including a lubrication system to control movement of at least one of the clutches.

Example 14 includes the aircraft engine of example 13, wherein the lubrication system includes at least one solenoid valve to control a flow of lubricant to actuate ones of the clutches.

Example 15 includes the aircraft engine of any of examples 13 or 14, further including a lubricant reservoir to supply lubricant to the lubrication system to control the clutches.

Example 16 includes the aircraft engine of any of examples 12 to 15, wherein the gearbox includes a disconnect to disconnect the compressor from the aircraft engine to prevent fluid from moving through the fluid channel.

Example 17 includes the aircraft engine of any of examples 12 to 16, further including a controller to control the gearbox to control a shaft speed of a compressor shaft to maintain a desired air flow via the compressor.

Example 18 includes the aircraft engine of any of examples 12 to 17, wherein the gearbox includes a planetary gear.

Example 19 includes the aircraft engine of any of examples 12 to 18, wherein the first gear ratio corresponds to engagement of a first sprag clutch, and wherein the second gear ratio corresponds to engagement of a second sprag clutch and a ring gear clutch.

Example 20 includes the aircraft engine of any of examples 12 to 19, further including a controller to control the gearbox based on an aircraft operating condition including at least one of takeoff, cruise, or landing.

Example 21 includes the aircraft engine of example 12, wherein the clutches include a sprag clutch, a carrier clutch, and a ring gear clutch.

Example 22 includes a method of controlling a compressor of an aircraft. The method includes determining an operating condition of the aircraft and controlling, based on the operating condition, clutches to vary a gearbox between a first gear ratio and a second gear ratio different from the first gear ratio. The gearbox is to control a flow rate of fluid moving from the compressor to a fuselage of the aircraft.

Example 23 includes the method of example 22, further including controlling engagement or disengagement of at least one of the clutches via at least one solenoid.

Example 24 includes the method of any of examples 22 or 23, wherein controlling the gearbox to the first gear ratio includes engaging a first sprag clutch, and wherein controlling the gearbox to the second gear ratio includes engaging a second sprag clutch and a ring gear clutch.

Example 25 includes the method of any of examples 22 to 24, wherein the gearbox is controlled to the first gear ratio via a first solenoid, and wherein the gearbox is controlled to the second gear ratio via a second solenoid different from the first solenoid.

Example 26 includes the method of any of examples 22 to 25, further including providing lubrication to the clutches via a lubrication system to control movement of at least one of the clutches.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of aircraft, examples disclosed herein can be applied to any appropriate compressor application and/or vehicle including, but not limited to, watercraft, ground-based vehicles, submersibles, etc.

The following claims are hereby incorporated into this Detailed Description by this reference, with each claim standing on its own as a separate embodiment of the present disclosure.

What is claimed is:

1. An apparatus for use with a vehicle, the apparatus comprising:
    a fluid channel to convey a fluid;
    a compressor fluidly coupled to the fluid channel;
    a gearbox operatively coupled to the compressor with a shaft, the gearbox to control the compressor via the shaft with a first gear ratio and a second gear ratio different from the first gear ratio to vary a flow rate of fluid in the fluid channel; and
    clutches to vary the gearbox between the first gear ratio and the second gear ratio.

2. The apparatus of claim 1, further including a controller operatively coupled to the clutches to control the gearbox between the first and second gear ratios based on an aircraft operating condition.

3. The apparatus of claim 2, wherein the controller controls the gearbox to maintain a shaft speed associated with the shaft of the compressor to maintain a desired air flow to a cabin of an aircraft.

4. The apparatus of claim 1, further including a lubrication system to control at least one of the clutches.

5. The apparatus of claim 4, wherein the lubrication system includes at least one solenoid valve to control a flow of a lubricant to direct engagement or disengagement of the clutches.

6. The apparatus of claim 4, wherein the lubrication system is to provide lubricant to the gearbox.

7. The apparatus of claim 1, wherein the gearbox includes a planetary gear.

8. The apparatus of claim 1, wherein the first gear ratio corresponds to engagement of a first sprag clutch, and wherein the second gear ratio corresponds to engagement of a second sprag clutch and a ring gear clutch.

9. The apparatus of claim 8, wherein the gearbox further includes a third gear ratio corresponding to engagement of the second sprag clutch and a carrier clutch.

10. The apparatus of claim 1, wherein the clutches include a sprag clutch, a carrier clutch, and a ring gear clutch.

11. The apparatus of claim 1, further including a piston and a stator, wherein at least one of the piston or the stator is non-rotatable.

12. An aircraft engine comprising:
    a fluid channel having an inlet and outlet; and
    a compressor including:
        a gearbox coupled to an output shaft, the gearbox to control the output shaft with a first gear ratio and a second gear ratio different from the first gear ratio, and clutches to control the gearbox between the first gear ratio and the second gear ratio to vary a flow rate of fluid in the fluid channel.

13. The aircraft engine of claim 12, further including a lubrication system to control movement of at least one of the clutches.

14. The aircraft engine of claim 13, wherein the lubrication system includes at least one solenoid valve to control a flow of lubricant to actuate at least one of the clutches.

15. The aircraft engine of claim 13, further including a lubricant reservoir to supply lubricant to the lubrication system to control the clutches.

16. The aircraft engine of claim 12, wherein the gearbox includes a disconnect to disconnect the compressor from the aircraft engine to prevent fluid from moving through the fluid channel.

17. The aircraft engine of claim 12, further including a controller to control the gearbox to control a shaft speed of a compressor shaft to maintain a desired air flow via the compressor.

18. The aircraft engine of claim 12, wherein the gearbox includes a planetary gear.

19. The aircraft engine of claim 12, wherein the first gear ratio corresponds to engagement of a first sprag clutch, and wherein the second gear ratio corresponds to engagement of a second sprag clutch and a ring gear clutch.

20. The aircraft engine of claim 12, further including a controller to control the gearbox based on an aircraft operating condition including at least one of takeoff, cruise, or landing.

21. The aircraft engine of claim 12, wherein the clutches include a sprag clutch, a carrier clutch, and a ring gear clutch.

22. A method of controlling a compressor of an aircraft, the method comprising:
    determining an operating condition of the aircraft; and
    controlling, based on the operating condition, clutches to vary a gearbox operatively coupled to the compressor with a shaft between a first gear ratio and a second gear ratio different from the first gear ratio, the gearbox to control the shaft with the first gear ratio or the second gear ratio to vary a flow rate of fluid moving from the compressor to a fuselage of the aircraft.

23. The method of claim 22, further including controlling engagement or disengagement of at least one of the clutches via at least one solenoid.

24. The method of claim 22, wherein controlling the gearbox to the first gear ratio includes engaging a first sprag clutch, and wherein controlling the gearbox to the second gear ratio includes engaging a second sprag clutch and a ring gear clutch.

25. The method of claim 22, wherein the gearbox is controlled to the first gear ratio via a first solenoid, and wherein the gearbox is controlled to the second gear ratio via a second solenoid different from the first solenoid.

26. The method of claim 22, further including providing lubrication to the clutches via a lubrication system to control movement of at least one of the clutches.

* * * * *